US012691747B2

(12) United States Patent
Dalum

(10) Patent No.: US 12,691,747 B2
(45) Date of Patent: Jul. 28, 2026

(54) ELECTRIC GENERATOR FOR ELECTRIC VEHICLE

(71) Applicant: Power Technology Holdings LLC, Pewaukee, WI (US)

(72) Inventor: Joseph T. Dalum, Delafield, WI (US)

(73) Assignee: Power Technology Holdings LLC, Pewaukee, WI (US)

( * ) Notice: Subject to any disclaimer, the term of this patent is extended or adjusted under 35 U.S.C. 154(b) by 207 days.

(21) Appl. No.: 18/333,497

(22) Filed: Jun. 12, 2023

(65) Prior Publication Data

US 2024/0075804 A1 Mar. 7, 2024

Related U.S. Application Data

(63) Continuation-in-part of application No. PCT/US2021/063367, filed on Dec. 14, 2021.

(60) Provisional application No. 63/125,798, filed on Dec. 15, 2020, provisional application No. 63/125,230, filed on Dec. 14, 2020.

(51) Int. Cl.
| | |
|---|---|
| *B60L 7/12* | (2006.01) |
| *B60K 6/442* | (2007.10) |
| *B60L 50/52* | (2019.01) |
| *B60L 50/60* | (2019.01) |

(52) U.S. Cl.
CPC .............. *B60K 6/442* (2013.01); *B60L 7/12* (2013.01); *B60L 50/52* (2019.02); *B60L 50/60* (2019.02); *B60L 2200/40* (2013.01); *B60L 2220/20* (2013.01); *B60Y 2200/142* (2013.01); *B60Y 2200/91* (2013.01); *B60Y 2200/92* (2013.01); *B60Y 2400/112* (2013.01); *B60Y 2400/602* (2013.01)

(58) Field of Classification Search
CPC ......... B60K 6/442; B60L 50/60; B60L 50/52; B60L 7/12; B60L 2200/40; B60Y 2200/142; B60Y 2200/91; B60Y 2200/92
USPC ....................................................... 180/65.23
See application file for complete search history.

(56) References Cited

U.S. PATENT DOCUMENTS

| | | | |
|---|---|---|---|
| 5,642,270 A * | 6/1997 | Green | .................... B60L 53/11 363/17 |
| 5,816,741 A | 10/1998 | Troppman | |
| 6,233,508 B1 * | 5/2001 | Deguchi | ................. B60L 50/15 180/65.23 |
| 6,251,042 B1 | 6/2001 | Peterson et al. | |

(Continued)

FOREIGN PATENT DOCUMENTS

WO WO-2010/065476 A2 6/2010

OTHER PUBLICATIONS

International Search Report and Written Opinion regarding Application No. PCT/US2021/063367, mail date Apr. 18, 2022, 18 pages.

*Primary Examiner* — Hau V Phan
(74) *Attorney, Agent, or Firm* — Foley & Lardner LLP

(57) ABSTRACT

A vehicle includes a first prime mover and a first prime mover driven transmission. A vehicle drive system for the vehicle includes an electric energy source, an electric motor in direct or indirect mechanical communication with the first prime mover, and a high power generator coupled to the electric motor. The electric motor is configured to generate energy for storage in the energy source via rotation using power from the first prime mover and drives the generator using energy from the electric energy source.

20 Claims, 11 Drawing Sheets

(56)                    References Cited

U.S. PATENT DOCUMENTS

| | | | | |
|---|---|---|---|---|
| 8,319,358 B2 * | 11/2012 | Curry | .................... | B60L 53/126 |
| | | | | 290/1 A |
| 8,508,058 B2 * | 8/2013 | Hamilton | ................. | H02J 3/46 |
| | | | | 290/1 R |
| 8,567,540 B2 * | 10/2013 | Janson | ................... | B60K 6/365 |
| | | | | 903/910 |
| 8,978,798 B2 | 3/2015 | Dalum et al. | | |
| 9,061,680 B2 * | 6/2015 | Dalum | ................... | B60K 25/02 |
| 9,151,336 B2 | 10/2015 | Wesley et al. | | |
| 9,428,041 B2 * | 8/2016 | Tamagawa | .............. | B60L 50/61 |
| 9,561,719 B2 | 2/2017 | Lo et al. | | |
| 9,643,593 B2 * | 5/2017 | Dalum | .............. | B60W 30/1888 |
| 9,751,518 B2 * | 9/2017 | Dalum | ...................... | B60L 1/00 |
| 9,878,616 B2 * | 1/2018 | Dalum | ................... | B60K 25/00 |
| 9,878,717 B2 * | 1/2018 | Keilers | .............. | B60W 10/108 |
| 10,464,423 B2 * | 11/2019 | Frank | ...................... | B60L 58/12 |
| 11,161,403 B2 | 11/2021 | Lo et al. | | |
| 11,225,240 B2 * | 1/2022 | Dalum | ................... | B60K 25/02 |
| 2009/0204280 A1 | 8/2009 | Simon, Jr. et al. | | |
| 2010/0005785 A1 | 1/2010 | Breuer et al. | | |
| 2010/0006356 A1 | 1/2010 | Curry et al. | | |
| 2010/0187905 A1 * | 7/2010 | Tang | ...................... | B60L 50/52 |
| | | | | 307/10.1 |
| 2010/0219007 A1 | 9/2010 | Dalum et al. | | |
| 2011/0174578 A1 | 7/2011 | Richard et al. | | |
| 2012/0207620 A1 | 8/2012 | Dalum et al. | | |
| 2014/0256505 A1 | 9/2014 | Dalum et al. | | |
| 2015/0204758 A1 | 7/2015 | Schnell et al. | | |
| 2017/0355373 A1 * | 12/2017 | Dalum | ............... | F16H 61/0031 |
| 2019/0143957 A1 | 5/2019 | Dalum et al. | | |
| 2020/0298722 A1 * | 9/2020 | Smolenaers | ............ | H02J 7/345 |
| 2020/0376949 A1 * | 12/2020 | Furukawa | .............. | B60L 1/003 |
| 2021/0031649 A1 * | 2/2021 | Messina | ................. | B60K 23/00 |

* cited by examiner

ELECTRIC GENERATOR FOR ELECTRIC VEHICLE

CROSS-REFERENCE TO RELATED PATENT APPLICATION

The present application is a continuation in part of PCT Application Serial No. PCT/US2021/063367, filed Jun. 14, 2021 which claims the benefit of and priority to U.S. Provisional Patent Application No. 63/125,230, filed Dec. 14, 2020 and U.S. Provisional Patent Application No. 63/125,798, filed Dec. 15, 2020 incorporated herein by reference in their entireties including any appendices.

The present application is related to U.S. patent Ser. No. 10/427,520, filed Jan. 29, 2018, U.S. patent Ser. No. 10/781,910, U.S. Provisional Patent Application No. 62/714,006, filed Aug. 2, 2018, U.S. application Ser. No. 16/808,067, filed Mar. 3, 2020, U.S. Provisional Patent Application No. 63/036,649, filed Jun. 9, 2020, and U.S. application Ser. No. 17/027,648, filed Sep. 21, 2020, This application is also related to U.S. application Ser. No. 15/588,532 filed May 5, 2017 which is a Continuation of U.S. application Ser. No. 14/745,232, filed Jun. 19, 2015, (096637-0170), now U.S. Pat. No. 9,643,593 which is a continuation of U.S. application Ser. No. 14/081,892 filed Nov. 15, 2013, now U.S. Pat. No. 9,061,680, which is a Continuation-In-Part of US Application PCT/US2013/036431, filed Apr. 12, 2013 which claims priority to Provisional Application U.S. Application 61/624,118, filed Apr. 13, 2012, all of the above patent applications and patents are incorporated herein by reference in their entireties. This application is also related to U.S. application Ser. No. 15/067,419 filed Mar. 11, 2016 which is a continuation of U.S. application Ser. No. 13/812,723 filed Jan. 28, 2013, now U.S. Pat. No. 9,283,954, which claims priority to PCT Application 2012/029835, published as Publication No. WO2013/081657 having a filing date of Mar. 20, 2012, which claims the benefit of priority under 35 U.S.C. § 119(e) to U.S. Provisional Application Ser. No. 61/566,526 (096637-0142), filed on Dec. 2, 2011, all of the above patent applications and patents are incorporated herein by reference in their entireties including any appendices.

The application is also related to application Ser. No. 13/629,533 filed Sep. 27, 2012, now U.S. Pat. No. 8,905,166 (0147) which is a divisional of U.S. Pat. No. 8,408,341 which is a continuation-in-part of U.S. patent application Ser. No. 12/130,888, filed May 30, 2008, now U.S. Pat. No. 8,978,798 (0106), which claims the benefit of priority under 35 U.S.C. § 119(e) to U.S. Provisional Application No. 60/979,755, filed Oct. 12, 2007, and U.S. Provisional Application No. 61/014,406, filed Dec. 17, 2007 which is a continuation-in-part of U.S. patent application Ser. No. 12/217,407, filed Jul. 3, 2008, now U.S. Pat. No. 8,818,588 (0115), which claims the benefit of priority under 35 U.S.C. § 119(e) to U.S. Provisional Application No. 60/959,181, filed Jul. 12, 2007, and U.S. Provisional Application No. 61/126,118, filed May 1, 2008, which is a continuation-in-part of PCT/US2009/066151, filed Nov. 30, 2009, published as Publication No. WO2010/065476 which claims the benefit of priority to U.S. Provisional Application No. 61/177,240, filed May 11, 2009, and U.S. Provisional Application No. 61/118,980, filed Dec. 1, 2008, and U.S. Provisional Application No. 61/235,998, filed Aug. 21, 2009, and U.S. Provisional Application No. 61/251,285, filed Oct. 13, 2009, is a continuation-in-part of PCT/US2008/008442, filed Jul. 10, 2008; published as Publication No. WO2009/009078, and which is a continuation-in-part of PCT/US2008/079376, filed Oct. 9, 2008, published as Publication No. WO2009/049066 which is a continuation of U.S. application Ser. No. 12/130,888, filed on May 30, 2008, now U.S. Pat. No. 8,978,798 which claims the benefit of priority to U.S. Provisional Application No. 60/979,755, filed on Oct. 12, 2007, and U.S. Provisional Application No. 61/014,406, filed on Dec. 17, 2007. All of the above patents and applications are incorporated herein by reference in their entireties.

BACKGROUND OF THE INVENTION

The present disclosure relates to electric power generation on a vehicle, such as a truck, military equipment, a utility vehicle, a rover, or other mobile apparatus.

Vehicle systems can include electric vehicles, hybrid vehicles (e.g., "series-parallel" hybrids and parallel hybrids), and heat engine vehicles. Vehicle systems often have on-board rechargeable energy sources capable of providing power for electrical loads on vehicles. Generally, loads include those related to vehicle propulsion and vehicle stationary operation. Vehicles having on-board rechargeable energy sources can export power from the vehicle to supply power for equipment and tools on or near the vehicle, such as power provided from a truck to operate electric tools. Power can also be exported for a load, a facility, such as a hospital, or directly to the grid, known as vehicle to grid (V2G) power.

SUMMARY

Some embodiments relate to a vehicle drive system for a vehicle including a first prime mover and a first prime mover driven transmission. The vehicle drive system includes an electric energy source, an electric motor in direct or indirect mechanical communication with the first prime mover, and a high power generator coupled to the electric motor. The electric motor is configured to generate energy for storage in the energy source via rotation using power from the first prime mover and drives the generator using energy from the electric energy source.

Some embodiments relate to a method of operating a vehicle having an at least partially electric vehicle drive system. The vehicle includes a first prime mover, an electric energy source, and a prime mover driven transmission. The method includes operating an electric motor directly or indirectly coupled to the first prime mover via a PTO or an interface in mechanical communication with the first prime mover to drive a high power generator coupled to the electric motor. The method also includes uncoupling the electric motor from the first prime mover and operating the electric motor using power from the electric energy source to drive the high power generator.

Some embodiments relate to a vehicle drive system for a vehicle including a transmission and a rechargeable electrical energy source. The vehicle drive system includes a first electric motor in direct or indirect mechanical communication with a transmission. The electric motor is configured to propel the vehicle using power from the electrical energy source. A second electric motor is in direct or indirect mechanical communication with a high power generator. The second electric motor is configured to rotate the generator using power from electrical energy source.

Some embodiments relate to a hybrid vehicle drive system for a vehicle including a first prime mover, a first prime mover driven transmission and a rechargeable power source. The hybrid vehicle drive system further includes an electric motor in direct or indirect mechanical communication with the first prime mover. The electric motor can provide power to the first prime mover and can drive a high power generator.

An exemplary embodiment relates to a hybrid vehicle drive system for use with a prime mover and a first transmission driven by the first prime mover. The system includes a second prime mover coupled to a rechargeable energy source, an interface and an accessory. The accessory is configured to be coupled to the second prime mover. The first prime mover is configured to provide power through the interface to the second prime mover to operate the second prime mover, and the second prime mover is configured to provide power to the drive shaft through the interface. The interface is before a transmission gear capable of driving a PTO. The accessory is configured to be coupled to the second prime mover so the accessory is operated through the operation of the second prime mover. The second prime mover can drive a first high power generator, a second high power generator, or both the first high power generator and the second high power generator.

Another exemplary embodiment relates to a method of retrofitting a vehicle with a power generation system. The vehicle includes a prime mover driven transmission and a first prime mover. The method includes attaching an electric motor at in interface between the transmission and the first prime mover. The interface is a gear attached to a fly wheel coupled to the first prime mover, a ring gear, or a gear attached to a crank shaft of the first prime mover. The method also includes attaching a transmission with an integrated electric generator. Alternatively, a PTO may be directly connected to a first prime mover driven transmission at one end and a second prime mover at the other end. The electric motor can drive a generator.

Another exemplary embodiment relates to a method of retrofitting a vehicle with a hybrid vehicle drive system. The vehicle includes a first prime mover, and a prime mover driven transmission. The method includes attaching an electric motor at a PTO or an interface to be in mechanical communication with the first prime mover. The interface can be a gear attached to a flywheel coupled to the first prime mover, a ring gear, or a gear attached to a crank shaft of the first prime mover. A belt, chain or additional gears may optionally be used to transmit power from the electric motor. The method also includes operating the electric motor when the vehicle is stopped to drive an accessory driven by the first prime mover during idle to reduce fuel consumption. The electric motor can drive a generator.

Another exemplary embodiment relates to a method of retrofitting a vehicle with a hybrid vehicle drive system. The vehicle includes a first prime mover and a prime mover driven transmission. The method includes attaching an electric motor to an interface or a PTO to be in mechanical communication with the transmission and the first prime mover. The interface can be a gear attached to a fly wheel coupled to the first prime mover or a gear attached to a crank shaft of the first prime mover. The method also includes attaching a transmission with an integrated generator or attaching a generator to the electric motor.

Another exemplary embodiment relates to a vehicle including a generator that supplies AC voltage output without using the normal export power inverters. The rotating a generator can serve as a mechanical backup if an electronic power take off (EPTO) system fails and may perform better than inverters, The vehicle includes an internal combustion engine (ICE) chassis and can provide advantages over an electric vehicle (EV) that may not include a transmission.

Another exemplary embodiment relates to a EV (or plug-in hybrid EV (PHEV) with series hybrid propulsion) that uses a high voltage battery traction battery and secondary battery for powering truck-mounted equipment and generator replacement, where the energy between the two systems can be transferred to maximize range or time at the worksite. The secondary battery provides value since equipment may operate at lower voltages more optimal for accessories, and because the secondary battery (non-traction type) offers packaging flexibility, where an EV cannot easily add more energy to its traction battery. The conventional EV cannot easily add more energy because the form factor needed for 600V+ batteries may be too large (too many cells in series) compared to 350V or lower voltage systems. For example, a secondary battery system can be mounted between the frame rails behind the rear axle where a conventional 600V battery cannot fit.

BRIEF DESCRIPTION OF THE DRAWINGS

Various aspects and advantages of systems and methods will become apparent to those skilled in the art from the following detailed description of the embodiments.

Embodiments will be described with reference to the accompanying drawings, wherein like reference numerals indicate like elements, and.

DETAILED DESCRIPTION

Figure 1A:
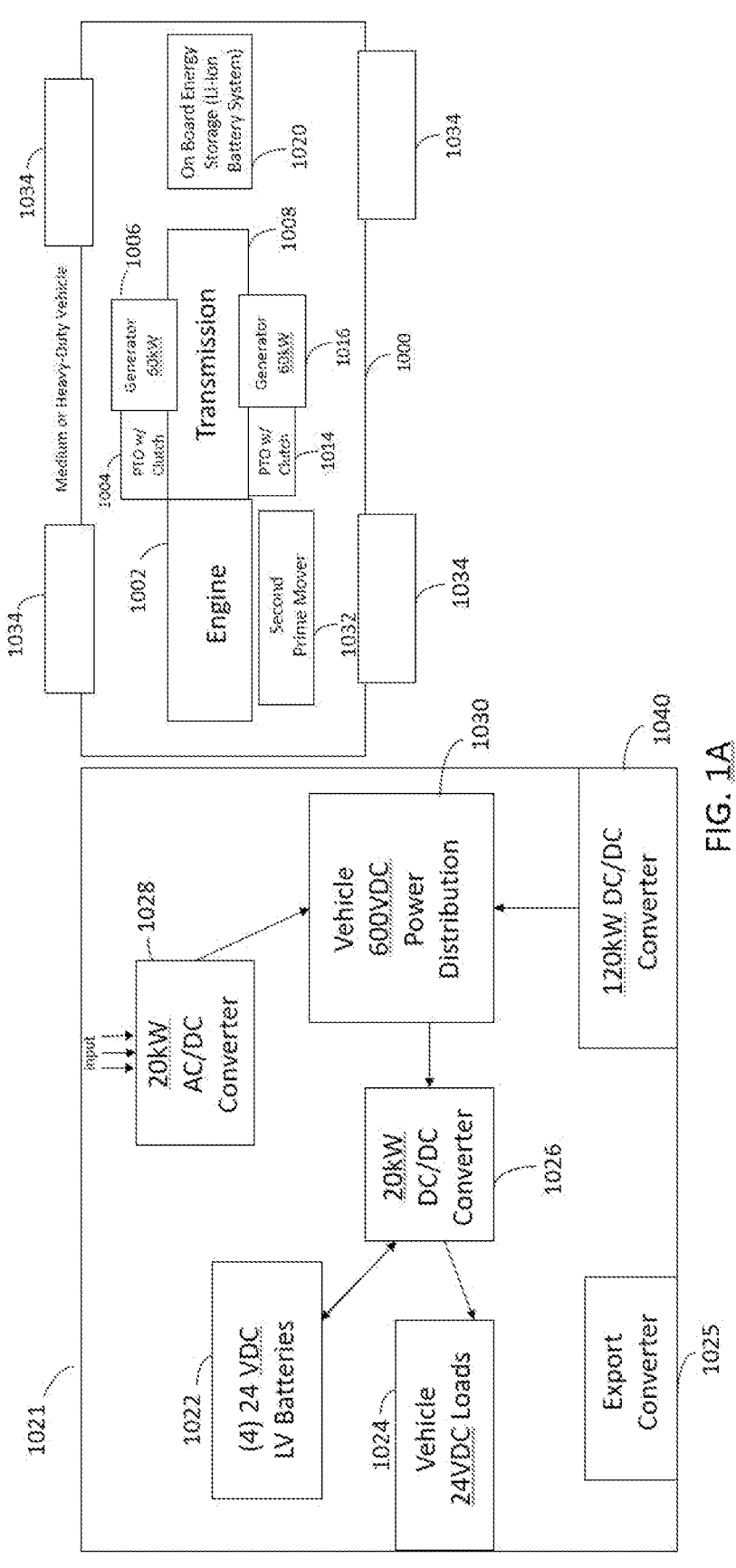
FIG. 1A is a general block diagram of a hybrid vehicle drive system according to an exemplary embodiment.

Vehicle drive systems including hybrid and electric vehicle drive systems according to some embodiments are discussed. In some embodiments, a vehicle is equipped with a mechanically rotated generator to generate electrical power. Generated power from the vehicle is provided at a different operating voltage from the voltage of the rechargeable energy source on the vehicle, such as a battery, or is provided as alternating current (AC) power instead of direct current (DC) in some embodiments. The vehicles recharge the energy source using an on-vehicle methods of generation in some embodiments. As an example, depending upon vehicle configuration, a rechargeable energy source is recharged by the vehicle engine (hybrid electric vehicle, also referred to as HEV), by either the vehicle engine or the grid (plug-in hybrid electric vehicle, also referred to as PHEV), or by only the grid (electric vehicle, also known as EV). Other methods can be used to recharge batteries without the grid, or in combination with the grid, including solar cells mounted on vehicles or attached trailers in some embodiments.

In some embodiments, vehicle systems and methods provide energy in the voltage ranges supplied by the grid (e.g., 120 Volt AC (VAC) in the U.S. and Canada (the actual allowable voltage may range from 114 V to 126 V (RMS) −5% to +5%) at 60 Hz) and provides an interface for tools to be plugged in and to operate, or for other loads accepting standard grid power. Grid power voltage may vary, and include standard levels for 208V, 240V, 277V, and 480V in some embodiments. In some embodiments, vehicle systems and methods provide energy in the voltage ranges outside of the U.S. grid voltage standards (e.g., 50 Hz 230 V, 50 Hz 240 V, 50 Hz 100 V, 60 Hz 110 V, 60 Hz 115 V, 60 Hz 127 V, 60 Hz 220 V, 60 Hz 230 V, 60 Hz 240 V, 60 Hz 100 V, 50 Hz 110 V, 50 Hz 115 V, 50 Hz 127 V, and 50 Hz 220V).

In some embodiments, an export power system can be used on the Daimler FCCC MT50e fully electric chassis. In some embodiments, the export power system has an energy source (e.g., a battery) and includes two plugs for recharging, one for the traction battery and one for the export power system. In some embodiments, the export power system is a single cord system for charging a vehicle and can use a DC fast charger input or a level 2 J1772 input. In some embodiments, power is fed to one battery such as the traction battery first and then to another battery for accessories like hydraulic pumps or exportable 120V power so that both batteries are eventually charged using one plug. Architectures discussed in U.S. Pat. No. 7,830,117 can be modified for the export power system described above.

In some embodiments, a DC/DC converter is disposed between the traction battery and the accessory battery (e.g., operating at voltages greater than 250V) so that when the traction battery receives power from the grid, the traction battery can transfer that power to the accessory battery to recharge accessory battery. In some embodiments, a bi-directional DC/DC converter is used to recharge a 350V nominal accessory battery from a higher voltage traction battery and send energy back to the traction battery if needed to extend range or to direct power to an accessory battery in the field, such as if there was a storm and work trucks had to work multiple shifts.

In some embodiments, the accessory battery is smaller (e.g., 35 kWh) than the traction battery and can be advantageously disposed on the truck in locations which cannot be used for a traction battery. In some embodiments, using two batteries allows better protection for the traction battery, such as if a tool had a short, or the OEM chassis manufacturer does not to adapt a common interface to many different applications. The common interface could be used to communicate with the chassis, and provide energy for tools without reducing driving range, thereby making it easier for the OEM chassis manufacturer to supply EV work trucks. In some embodiments, the accessory battery can be sized to accommodate large equipment on the vehicle. In some embodiments, a standard chassis is provided with a single traction battery size and a number of accessory battery size options. In some embodiments, fewer battery size options.

Referring to FIG. 1A, a vehicle 1000 includes a drive system 1001 according to several exemplary embodiments are shown. Various features of the embodiments discussed in FIGS. 1A and 1B can be employed in other embodiments described herein. It is noted that any of the embodiments of FIGS. 1-20 of U.S. patent application Ser. No. 12/710,247 (incorporated herein by reference in its entirety) could substitute the interface between the second prime mover and the first prime mover in the present application in any of FIGS. 1-8 for the power take off (PTO) configurations in U.S. patent application Ser. No. 12/710,247.

Vehicle 1000 includes a heat engine 1002 (e.g., a prime mover such as a CAT C7 engine), a transmission 1008 (e.g., an Allison transmission), a component 1004 (a power take off with a clutch), a generator 1006 (e.g., a 60 kilowatt (kW) generator (single or three phase)), a component 1014 (a power take off with a clutch), a generator 1016 (e.g., a 60 kW generator (single or three phase)), and an energy system 1020. Energy system 1020 is on on-board energy storage system (e.g., a set of batteries) and is coupled to generators 1006 and 1016 for receiving energy from generators 1006 and 1016 in some embodiments.

In some embodiments, electric motors can be provided serially with generators 1006 and 1016 and components 1004 and 1014 or generators 1006 and 1016. The electric motors use power from the energy system 1020 to drive or mechanically rotate generators 1006 and 1016, thereby providing quieter operation, idle reduction, instant start, and fuel savings.

Vehicle 1000 may provide energy to a grid or microgrid. The microgrid 1021 as an example energy system 1021 including a rechargeable energy source 1022 (e.g., a set of four 24 VDC low voltage batteries, or high voltage batteries, such as 350 VDC, 600 VDC or greater), a vehicle load interface 1024, a converter 1026 (e.g., a 20 kW DC/DC converter), a converter 1028 (e.g., a 20 kW AC/DC converter), a power distribution system 1030 (e.g., a 600 VDC vehicle power distribution system), and a converter 1040 (e.g., a 120 kW DC/DC converter) according to some embodiments. Converter 1040 receives power from generators 1006 and 1016 and converts the power to a DC voltage level for distribution system 1030. Distribution system 1030 provides the DC to power to vehicle loads at various voltage levels. DC power at 600 VDC is provided to converter 1026 which provides 24 DC power to energy source 1022 and vehicle loads 1024 in some embodiments. AC power from a grid or other source can be provided to converter 1028 for conversion to 600 VDC for vehicle distribution system 1030. In some embodiments, generators 1006 and 1016 are AC generators and converter 1040 provides conversion of power from the generators 1006 and 1016 to DC power. In some embodiments, generators 1006 and 1016 include AC to DC converters or are DC generators. In some embodiments, converter 1040 is optionally located on the vehicle 1000 or is part of the microgrid infrastructure not located on the vehicle 1000. Although described below as a hybrid vehicle, vehicle 100 can be an electric vehicle (EV) (e.g., all electric) or a non-hybrid vehicle and include the components associated with power generation and energy system 1020 described herein.

Figure 1B:
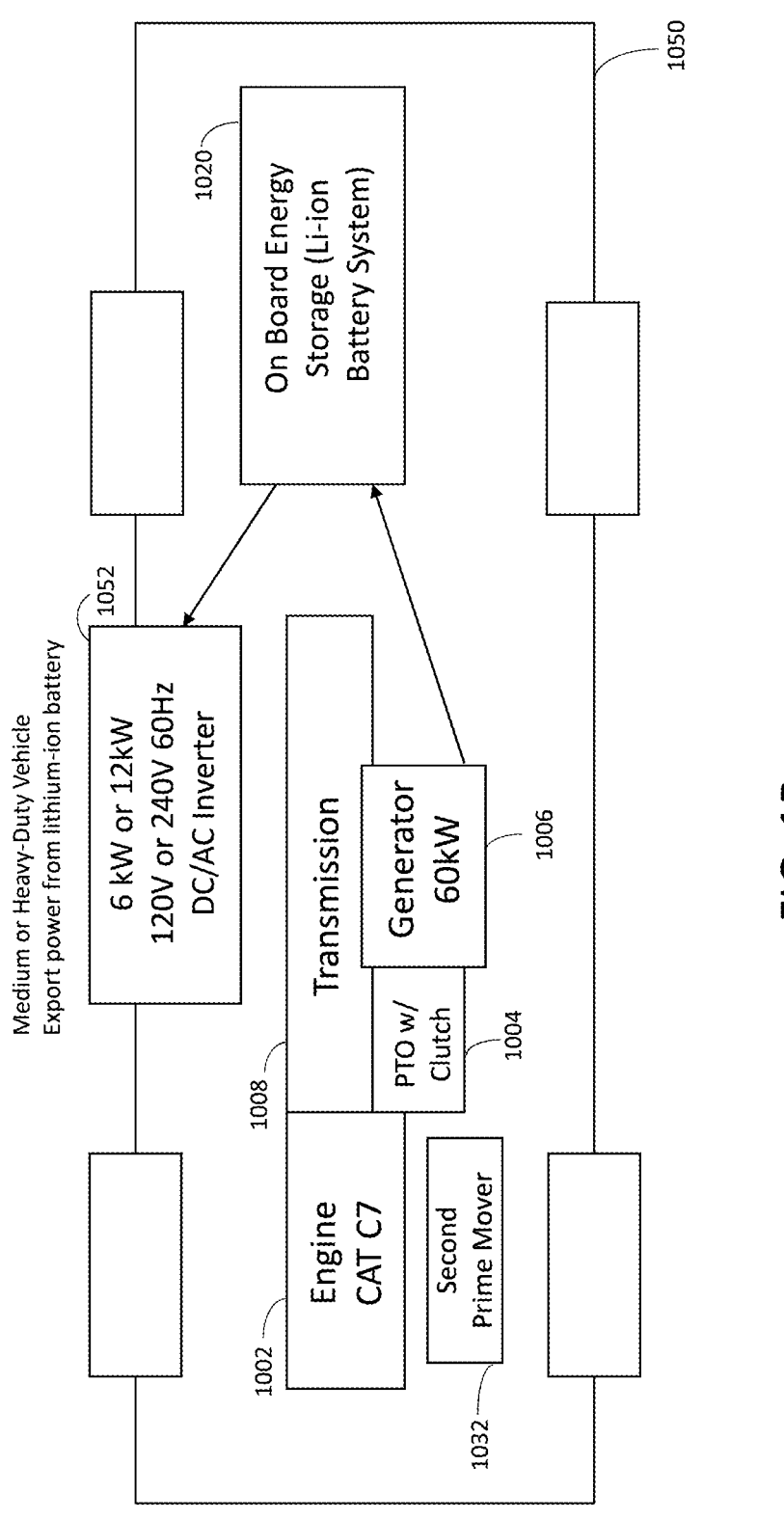
FIG. 1B is a general block diagram of a hybrid vehicle drive system according to a further exemplary embodiment.

Components 1004 and 1014 drive generators 1006 and 1016 using power from vehicle (e.g., engine 1002) or wheels 1034. Clutches are used to disengage generators 1006 and 1016 when not necessary (e.g., while driving and not braking). Generators 1006 and 1016 and other generators discussed herein may produce alternating or direct current, depending upon design criteria and system parameters. Generators 1006, 1016 and other generators discussed herein may also operate at a different rpm from the second prime mover 1032, allowing the second prime mover 1032 to operate with high efficiency. As an example, a gear box or a belt may transmit power from the second prime mover 1032 to the generators 1006, 1016 and other generators discussed herein. Generators 1006 and 1016 are high power generators such as above 20 KW (e.g., 60 KW, 40 KW, 80 KW, 180 KVA, etc.) in some embodiments. In some embodiments, generators 1006 and 1016 are continuous wave 50/60 Hz single or three phase 120 VAC to 480 VAC generators. Generators 1006 and 1016 operate at a constant lower rate (e.g., 3600 revolutions per minute (RPM) or 1800 RPM) in some embodiments. Vehicle 1000 may optionally have only one PTO and one generator as shown in FIG. 1B.

Figure 6:
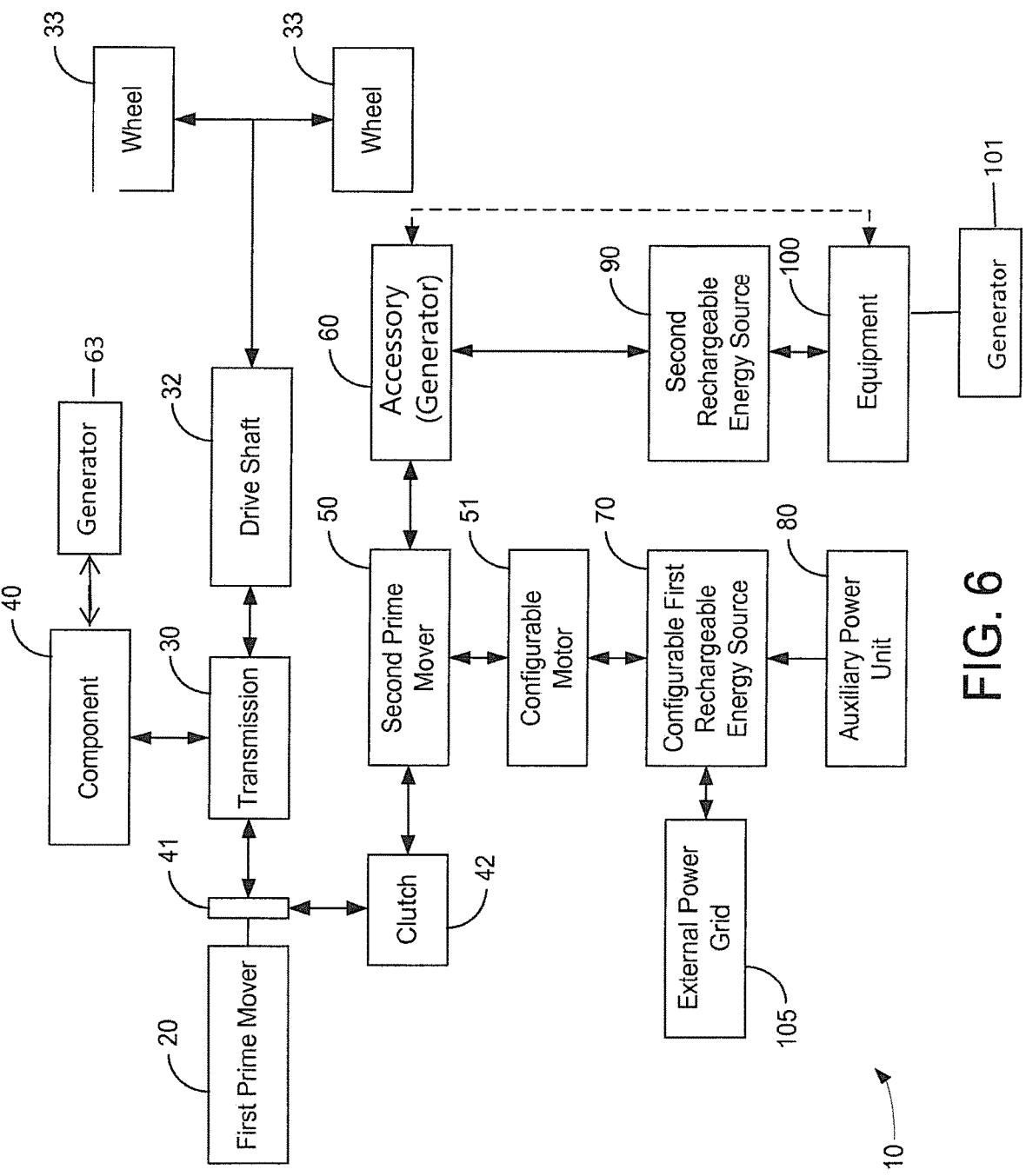
FIG. 6 is a general block diagram of a hybrid vehicle drive system according to still yet another exemplary embodiment.
Figure 7:
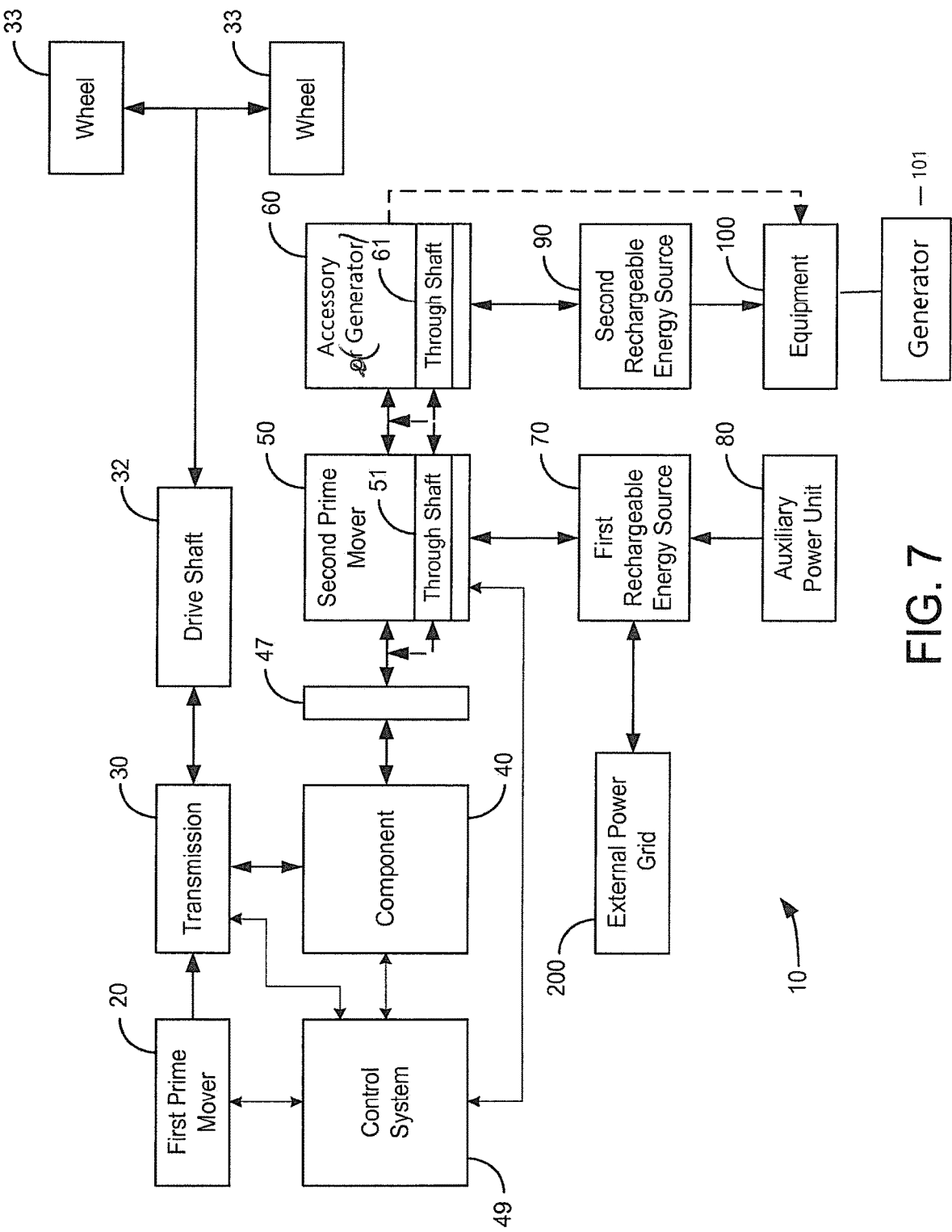
FIG. 7 is a general block diagram of a hybrid vehicle drive system according to an exemplary embodiment.

Vehicle 1000 can employ any of the drive systems discussed with reference to FIGS. 1-8 to drive generators 1006, 1016 and other generators discussed herein. FIG. 7 shows a hybrid drive system 10 which can be used as system 1001 with a PTO or component 40 coupled to a prime mover 50 and an accessory 60 (e.g., a generator) via one or more through shafts 51 and 61. A second component 40 can be provided in drive system 10 to drive a second generator as in drive system 1001 in FIG. 1A. Through shaft 61 can have one or more through shafts if one more additional pumps are attached as "piggyback pumps." Shaft 61 in accessory 60 may alternately terminate within the accessory 60 housing. Alternatively, other types of connections between component 40 and mover 50 and accessory 60 can be utilized. One or more optional clutches 47 can be disposed between component 40 and mover 50, between mover 50 and accessory 60, or between accessory 60 and component 40. In some embodiments, clutch 47 may be enclosed within the housing of component 40. Component 40 may be a power take-off (PTO). An electronic control system 49 similar to a control system 14 discussed in U.S. application Ser. No. 13/812,373, incorporated herein by reference or VMCS 6 discussed in U.S. application Ser. No. 12/217,407 incorporated herein by reference can control and/or communicate with mover 20, mover 50, component 40, transmission 30, clutch 47, generators 53, 63, and 101, etc.

The drive system 1001 can be hybrid systems as shown in FIG. 1-5, 7, 9-11, 13, 14, 15, 18, 19, 20 in U.S. patent application Ser. No. 12/130,888 (incorporated herein by reference in its entirety) unmodified or modified to have an interface 41 according to certain embodiments. In some embodiments, the hybrid systems as shown in FIG. 1-5, 7, 9-11, 13, 14, 15, 18, 19, 20 in U.S. patent application Ser. No. 12/130,888 are modified to include to accessories (generators 1006 and 1016). Components 1004 and 1014 can be a mid-mounted, front mounted or rear mounted PTO associated with transmission 1008 in some embodiments.

As shown in FIG. 1A, an exemplary embodiment of drive system 1001 can be employed on any type of vehicle 1000. According to one embodiment, the vehicle 1000 can be any type of light, medium, or heavy duty truck. In some embodiments, the vehicle 1000 is a truck that employs hydraulic systems such as a boom truck or a military vehicle with an electronic or photonic weapon system. Alternatively, the vehicle 1000 can be any type of platform where hybrid systems are employed. The vehicle 1000 may have a wide variety of axle configurations including, but not limited to a 4×2, 4×4, or 6×6 configuration. As discussed with reference to FIG. 5, the vehicle 1000 associated with system 1001 can be a tracked vehicle, a tractor, or construction equipment (e.g., loader, backhoe, paver, steam roller, road roller, roller-compactor, skid steer, forklift, excavator, mini-excavator, track crane, bull dozer, etc.).

In some embodiments, the vehicle 1000 is a truck such as an Freightliner M2 106 4×2 truck. According to one exemplary embodiment, the vehicle 1000 includes a Cummins B6.7 engine with an output ratings from 280 HP to 325 HP and peak torque ranges from 660 lb.-ft to 750 lb-ft, or a Detroit® DD13® Engine or a Cat C7 engine. Transmission is 1008 is an Allison 3500_RDS_P or other series automatic transmission, such as a 4500 RDS, or manual transmission, or automated manual transmission in some embodiments. The vehicle 1000 has a front gross axle weight rating (GAWR) of 14,000/12,460 lbs., a rear GAWR of 19,000/12,920 lbs., and a total GAWR of 33,000/25,480. According to an exemplary embodiment, the vehicle 1000 may further include a hydraulic platform rotator, a hydraulic articulating jib and winch (e.g., with a capacity of 1000 lbs.), a hydraulic jib extension, hydraulic tool outlets, an on-board power charger providing 6 kW at 240 VAC, and electric air conditioning with a capacity of 5,000 BTU or greater. The above referenced vehicles, transmissions, power, boom, and types of components are exemplary only.

In some embodiments, energy system 1020 includes an interface for charging energy system 1020 and exporting power to an external system, e.g., a micro grid 1021. In some embodiments, the interface connects to a localized grid that can disconnect from a main power grid to operate autonomously. Advantageously, vehicle 1000 includes export power capability and acts as a Distributed Energy Resource (DER) as a vehicle to grid (V2G) system that produces electricity and is not part of the bulk electric system (BES) in some embodiments. In some embodiments, vehicles energy system 1020 and generators 1006 and 1016 are configured with electronics and components for exporting power to the grid at a specific frequency or with special safety systems, such as anti-islanding. In some embodiments, the exported power is supplied to a load isolated from the grid.

In some embodiments, the grid or microgrid is equipped with a power inverter or converter 1025 for exporting power to a vehicle or other load that may not operate using the same current or voltage provided by the micro grid, or grid. In some embodiments, the export power converter 1025 converts direct current, DC, power from source 1022, such as a battery, and create an alternating current, AC, power at a certain voltage. The AC power is generally output at the voltage and frequency required to operate a device or load connected to the micro grid or grid. In the case of the vehicle 1000 providing power to the grid, the voltage and frequency is synchronized with the voltage and frequency of the grid. A 12 pole motor can be used with a 10 pole generator to provide 60 Hz to 50 Hz frequency conversion.

In some embodiments, the export power converter 1025 may be mounted to vehicle 1000, to provide DC power to a micro grid designed to operate using DC power. In some embodiments, source 1022 is connected to a DC grid or micro grid via a DC-DC converter of the nominal DC operating voltage of the batteries associated with source 1022 to compensate for a battery system which generally does not have a constant output voltage. The variation in the output voltage can depend on the battery chemistry, current, ambient temperature and state of charge (SoC). The direct connections of a battery to a DC bus can result in fluctuations in the bus voltage and inrush current, thereby shortening the lifetime of the battery and creating stability and protection problems in the DC grid system.

In some embodiments, vehicle 1000 is configured as an export power system including a prime mover or engine 1002 (such as a diesel engine), a transmission 1008, component 1004 (e.g. PTO) connected to transmission 1008, a shaft (e.g., a torque tube, or an embedded shaft as a part of the PTO such as in the Chelsea PowerShift (Hydraulic) 10-Bolt Power Take-Off (PTO)-890 Series) PTO), second prime mover 1032 (e.g., a permanent magnet AC electric motor, or other electric motor), an optional clutch, a mechanical coupling such as shaft or interface, onboard power supply 1020 and electric generator 1006 (such as a DC generator, or AC generator). The shaft is a dampened shaft in some embodiments. The DC generator may be rotated such that it produces an approximate voltage, such as approximately 600V DC. The output of the electric generator 106 (e.g., a DC generator) is connected to a DC/DC converter (e.g., similar to converter 1020). The DC/DC converter acts to stabilize the output DC voltage (although the generator 106 varies in rotational speed, causing the DC power to vary) and reduces the output voltage variation). The DC/DC converter may be beneficial if a microgrid 1021 operates at 600V.

One advantage of using the DC generator is that a smaller and less expensive DC converter can be used to adjust the DC output to match the DC grid voltage in some embodiments. Further, costs are reduced by taking the output of a 350V DC battery and using a DC/DC converter to adjust the output to VDC rather than using second prime mover 1032 powered by drawing 350V DC through an inverter supplied energy by a battery, and rotating a DC generator near 600 VDC which then output powers to a smaller DC/DC converter that outputs 600 VDC much more precisely. In some embodiments, generator 1006 outputs AC power, and an electronic device is used to stabilize the AC power so that it can interface with an AC grid or microgrid 1021. The generator and electronic device are less expensive than a larger inverter.

In some application where packaging space is limited, an accessory (e.g., accessory 60) such as hydraulic pump may be coupled to second prime mover 1032, such that the hydraulic pump can supply hydraulic power to a hydraulically rotated generator located in a different position in the vehicle 1000, rather than closer to the second prime mover 50. A shaft output from the second prime mover to generator 1006 (AC or DC generator) may limit the location of the generator 1006. A hydraulic coupling advantageously can provide packaging flexibility in some embodiments.

In some embodiments, vehicle 1000 advantageously increases both the DC voltage level and the AC export power voltage to reduce the amount of current that must be supplied at a certain power level. In some embodiments, the engine 1002 advantageously drives one or both of generators 1006 and 1016 to provide higher power levels in a system 1001 that is lighter and less expensive than an export power inverter connected to batteries on a vehicle, especially at higher power levels, such as those over 50 kW. In some embodiments, system 1001 on the vehicle draws power from an energy source on the vehicle (e.g., source or system 1020), rather than exclusively from a continuously running engine, thereby reducing fuel consumption, emissions, and maintenance. The use of energy system 1020 on the vehicle 1000 (e.g., on board energy storage or system 1020, such as a battery), as a source for power enables the export of power from the vehicle 1000 with less noise than a conventional engine driven generator. The battery also enables energy to be exported from the vehicle 1000 that may have been produced by carbon free sources, such as a grid that utilizes wind or solar power, to be stored in the battery and used to export power later. The use of batteries on the vehicle 1000 can provide power in remote locations, where a grid may not be available. The use of batteries also permits power to be exported without placing wear and tear on an engine.

In some embodiments, the vehicle 1000 exports power and recharges the energy source 1022 using vehicle engine

1002 simultaneously if the energy in energy source 1022 were to drop below a defined level, or if the energy source 1022 becomes depleted and are unable to be recharged by other means (e.g., via converter 1028). Energy system 1022 may alternatively operate a higher voltage, such as 350V, 600V or higher DC. System 1001 advantageously optionally uses an engine to back-up the energy source 1022 or 1020 for higher reliability, thereby reducing the need for a second fuel powered engine coupled to the grid dedicated to the generation of electricity and reducing the maintenance and cost associated with operating two engines one on the vehicle and one on the grid. In some embodiments the vehicle 1000 has a Li-ion battery system. Li-ion battery system can receive power from engine 1001 through PTO 1014 and generator 1016. Generator 1016 may produce AC power that is converted to DC power by an inverter. The inverter takes the alternating current output of generator 1016 and converts it to DC for storage in storage or system 1020.

In some embodiments, energy system 1020 provides export power that can be electrically isolated from the vehicle 1000, thereby eliminating problems of potential differences in grounding of systems or of signals being transmitted over electrical connections between the vehicle 1000 and the micro grid through a power carrying conductor. In some embodiments, energy system 1020 is configured to produce high starting surge currents for short periods, that are very robust, can tolerate harsh environments, and tolerate a wide range of operating temperature. In some embodiments the generator 1016 or 1006 produce high starting surge currents for short periods, that are very robust, can tolerate harsh environments, and tolerate a wide range of operating temperature in comparison to export power systems relying upon solid state inverters and power electronics. In some embodiments, the vehicle 1000 includes an export power system and uses an export power system and method that is less expensive than using solid state inverters and converters, a better fit for high loads and has the capability to source heavy overload currents of 2-4× for short periods of time. Further, vehicle 1000 shares components with fixed, infrastructure based generation solutions to enable traditional facility back-up generators to function using stored energy without the addition of expensive power electronics in some embodiments.

Vehicle 1000 includes a second prime mover 1032 (e.g., an AC or DC electric motor) that can optionally be operated when the vehicle 1000 supplies additional power for propulsion in addition to power or propulsion provided by engine 1002. Second prime mover 1032 is a DC traction motor and is coupled to transmission 1008, the drive train of engine 1002 or components 1004 and 1014 in some embodiments. The second prime mover 1032 can optionally rotate a load (e.g., generators 1006 and 1016, vehicle propulsion, or other load) when the engine 1002 is operating. The load uses power from the engine 1002 or uses power from both the engine 1002 and second prime mover 1032, or from just the second prime mover 1032 alone when the second prime mover 1032 is not coupled to the engine 1002. When the second prime mover 1032 is not coupled to the engine 1002 (e.g., via a clutch), the second prime mover 1032 can draw power from energy system 1020 to rotate. When the second prime mover 1032 is operated and not coupled to the engine 1002, the engine 1002 may be turned off to save fuel and reduce emissions, noise and engine maintenance. Alternatively, the engine 1002 may be operated at an rpm not associated with that of the second prime mover 1032 when the engine 1002 and second prime mover 1032 are not coupled together, directly or indirectly. Components 1004 and 1014 may be used to couple the engine 1002 to the second prime mover 1032, either directly or through transmission 1008. An example of a direct connection could be a PTO connected to the crank shaft in the front of the engine 1002 (a Front Engine Power Take-off (FEPTO)) or a PTO connected to the rear of the engine, a Rear Engine Power Take-off (REPTO) in some embodiments. An example of a transmission mounted PTO could be a PTO mounted to an Allison Transmission. The PTO may have a clutch, and may be mounted to a 1000, 2000, 3000 or 4000 series transmission in some embodiments. In some embodiments, vehicle 1000 includes two second prime movers each associated with one of the components 1004 and 1006 and one of generators 1006 and 1016. In some embodiments, energy system 1020 is provided on an electric vehicle (EV) without hybrid operation or a heat engine prime mover.

Second prime mover 1032 can be installed between components 1004 or 1014 and an accessory in some embodiments. See FIGS. 2-9. The accessory may be a pump, compressor, or other device that receive rotational power. Optionally, the accessory may have transfer the power to the second prime mover 1032 through a through shaft in the accessory. In some embodiments, a gear box is used to transfer power between the engine 1002 and second prime mover 1032, or between the engine 1002 and the accessory, or between the second prime mover 1032 and the accessory.

In some embodiments, second prime mover 1032 includes a through shaft that couples to the generator 1006 or 1016, thereby providing a mechanism to transfer power from the second prime mover 1032 to generator 1006 or 1016, or from the engine 1002 through component 1004 or 1014 and the through shaft coupled to second prime mover 1032 and component 1004. In some embodiments which use a gearbox, either the engine 1002 or the second prime mover 1032 can power the generator 1006 or 1016, or the second prime mover 1032 can power the generator 1006 or 1016, without needing a through shaft. In some cases, such as when extra generating power is required, the engine 1002 and the second prime mover 1032 may both work to rotate generator 1006 or 1016 and/or other accessory. In some embodiments, both generators 1006 and 1016 are driven by second prime mover 1032, engine 1002, and a combination thereof or by a pair of electric motors, engine 1002, and combination thereof according to operational mode.

In some embodiments, an additional accessory, a second accessory, may be rotated by the second prime mover 1032. The second accessory may be a hydraulic pump or a compressor, or other load (e.g., another generator).

Vehicle 1000 includes a PTO mounted to the engine 1002 or to transmission 1008 in some embodiments. When the PTO is mounted to transmission 1008, power from the engine 1002 may be transferred through the transmission 1008 to the PTO. The PTO may have a clutch, or a clutch may be located elsewhere, between the engine 1002 and the second accessory. In some cases, the clutch maybe located between the transmission 1008 and the accessory, or the transmission 1008 may have a clutch within the transmission, locating the clutch between the engine 1002 and the accessory or generators 1006 and 1016. The clutch can be engaged to transfer power from the engine 1002 to the second prime mover 1032. The second prime mover 1032 transfers power from the engine 1002 to the generators 1006 and 1016. The second prime mover 1032 may also optionally transmit power to a second accessory, such as a hydraulic pump or compressor, through a shaft within the generator 1006 or 1016, or through a shaft within the second accessory (the pump). In some embodiments, a gearbox may attach the second prime mover 1032 to the generators 1006 and 1016 and to the second accessory (the pump).

By coupling the engine 1002 to the second prime mover 1032 and coupling the second prime mover 1032 to one or both of a first and second accessory, generator 1006 or 1016 can supply electrical power on vehicle 1000 to power a hydraulic pump to supply power for a device needing hydraulic flow, such as a crane, and if the second prime mover 1032 produces power for an inverter to charge system 1020. If the system 1020 has sufficient energy and the second prime mover 1032 sufficient power, the clutch may be opened between the second prime mover 1032 and the engine 1002, permitting the engine to turn off, while the second prime mover 1032 draws power from an energy system 1020 which can include a battery or ultra-capacitor or both, and powers one or both of the two accessories. In such a configuration, fuel, emissions, noise and engine wear may be reduced.

Alternatively, the second prime mover 1032 may be coupled to a hydraulic pump (e.g., e.g., accessory 60 in FIG. 2B), wherein the pump transmits hydraulic power to a hydraulic motor (equipment 100 in FIG. 2B) coupled to an electrical generator 101 (in FIG. 2B), or to a hydraulic motor coupled to a compressor. Such a configuration allows the second prime mover 1032 (or prime mover 50 in FIG. 2B) to operate the first, second accessory, separately or together, with the engine 1002 off (e.g., prime mover 20 off in FIG. 2B). Such a configuration may provide packaging benefits, where the coupling of the second prime mover 1032 or 50 using a shaft to one or two or more accessories 60 is difficult due to packaging or space constraints.

Vehicle 1000 has the ability to provide propulsion with or without power generation, and the second prime mover 1032 can optionally supply power to the transmission 1008 through component 1004 or 1014. While providing power, the second prime mover 1032 may operate alone, without operating a generator 1006 or 1016, operating only one of generator 1006 or 1016, or operating both generators 1006 and 1016. In some embodiments, second prime mover 1032 and a third prime mover (an additional electric motor) are coupled to a transmission through two PTOs to allow second prime mover 1032 to provide propulsion with varying rpm and the electric motor to operate at a constant rpm to provide constant generation of power via one or more of generators 1006 and 1016. In some embodiments, the second prime mover 1032 may be coupled to the PTO, embedded in transmission 1008, or located between the transmission 1008 and engine 1002, where the second prime mover 1032 can recharge system 1020 and optionally provide propulsion. The third prime mover draws power from the energy system 1020 (e.g., Li-ion battery) to rotate one or more of generators 1006 and 1016. Such a configuration is similar to a series hybrid. The third prime mover can operate at a selected rpm for one or more of generators 1006 and 1016. Gear boxes can be used to provide allow the generators 1006 and 1016 to rotate a different rotational speed, rpm, than the second prime mover 1032 or the optional third prime mover.

Embodiments of vehicle 1000 include series parallel configurations in which engine 1002 and generators 1006 and 1016 are coupled via the flywheel/crankshaft though a gear or other means, while a clutch resides behind the flywheel or gear that connects the engine 1002 and generators 1006 and 1016. A third prime mover can be attached to the components 1004 and 1014 that is coupled to the pump portion or turbine section of transmission 1008 (e.g., in an automatic transmission embodiment).

In some embodiments, the second prime mover 1032 could be embedded in the transmission 1008 with a generator 1006 or 1016 coupled to the second prime mover 1032. In some embodiments, the generator 1006 or 1016 is mounted in in the transmission 1008 as a transmission integrated generator (TIG). In some embodiments, the second prime mover 1032 is embedded in the transmission and powers the generator 1006 or 1016 through a PTO coupled to the transmission 1008. In some embodiments, a clutch disposed between the engine 1002 and the embedded second prime mover 1032 in the transmission 1008 allows the second prime mover 1032 to provide sole propulsion for the vehicle 1000 by opening the clutch, turning off the first engine 1002 and using power from system 1020 to operate the second prime mover 1032, and other loads such as power steering, braking, and other loads. Vehicle 1000 can be retrofitted by removing an existing transmission and replacing the transmission with the integrated transmission.

In some embodiments, rotational speed of one or more of generators 1006 and 1016 is altered by altering the rpm of the second prime mover 1032. Using such a method, the output frequency of alternating current can be adjusted. By having a separate rotational source (second prime mover 1032), generator rotational speed is controlled without having to change the RPM of the engine 1002 which can be difficult while driving. The second prime mover 1032 also provides the ability to react faster than an engine 1002 coupled generator 1006 or 1016, providing cleaner, more stable power under varying electrical loads in some embodiments.

Some embodiments of vehicle 1000 that uses generators 1006 and 1016 driven by at least one second prime mover 1032 have several advantages over vehicles that may use export power inverters to draw DC power from batteries to create or export AC power, or to create or export DC power. In a first example, power line isolation is difficult with inverter supplied export power. In some embodiments, an insulated shaft (e.g., a flexible insulated shaft) between the second prime mover 1032 and generators 1006 and 1016 allows the generators 1006 and 1016 to produce power without any electrical connection with the vehicle 1000. Using the insulated connection between the second prime mover 1032 and generators 1006 and 1016 completely isolates the input from the output. Such isolation may be beneficial in preventing signals from being transmitted, such as through power line carrier, between the input and the output, or in providing the ground or electrical operating characteristics of the input that differ from the output in some embodiments.

In a second example, a motor driven generator provides high starting surge currents. In a third example, rotating generators or converters are very robust, and can tolerate harsh environments. In a fourth example, rotating generators or converters are less expensive than solid state (power electronic) inverters at higher power levels, above approximately 10 kW. Generators 1006 and 1016 can scale in power at a lower increase in cost than solid state inverters, which can become very complex, heavy and expensive at high power levels. In another example, rotating generators (e.g., generators 1006 and 1016) can produce cleaner power than some types of inverters that introduce higher total harmonic distortion, depending upon how the inverter is designed. Some inverters can produce a wave form that is very choppy, causing problems for delicate power electronics.

Vehicle 1000 is capable of operating in a number of modes according to some embodiments. A control system including a processor and memory can execute software or instructions to manipulate subsystems of vehicle 1000 (e.g., components 1004 and 1014, clutches, generators 1006 or 1016, second prime mover 1032, transmission 1008, energy system 1020 and engine 1002) to provide the modes of operation describe herein. Certain modes or features discussed herein may not be provided without departing from the scope of the disclosure.

While driving, vehicle 1000 uses propulsion to move vehicle to one location to another. System 1001 may move the drive shaft alone, without power from engine 1002, providing very low emissions and fuel consumption driving. System 1001 may optionally provide parallel hybrid propulsion when engine 1002 also provides power, reducing the amount of fuel required. Vehicle 1000 may use electrical power for launch assist to help accelerate the vehicle, may use electrical power to sustain speed, or may use the electrical motor to help brake, reducing brake wear. Vehicle 1000 during propulsion may optionally generate electricity. Second prime mover 1032 may operate independently of the engine 1002 to power the generators 1006 and 1016. The engine 1002 operates at a preferred (e.g., optimal) rpm for movement of the vehicle 1000. If system 1020 requires recharging during vehicle movement, or the second prime mover 1032 becomes inoperative, the system 1001 may close a clutch to connect the engine 1002 to the generators 1006 and 1016, allowing the engine 1002 to operate the generators 1006 and 1016 while the second prime mover 1032 recharges the battery system or is inoperative.

When vehicle 1000 is stationary, the system 1001 may check the amount of energy in the rechargeable energy system 1020 and if sufficient, supply power to the second prime mover 1032 to operate the electrical generators 1006 and 1016 with the engine 1002 off. If the rechargeable energy source 1022 or 1020 drops below a first threshold of state of charge, the engine 1002 may be started. In some embodiments, a drop or tail off in DC voltage is an indicator of a drop in state of charge. Engine 1002 is operated at a speed (rpm) that allows the clutch interface to have very little difference in speed with the side of the clutch being rotated by the second prime mover 1032 in some embodiments. The clutch can be engaged with little wear to the clutch and minimal, very little, or no change in the rpm of the generator 1006 or 1016 after engagement.

Once the clutch is engaged, the engine 1002 can rotate the generator 1006 or 1016, while also optionally rotating the engine 1002 to recharge the rechargeable energy source 1022 or 1020. After the battery state of at least one of energy storage 1022 or energy system 1020 charge rises to a second level, the second level being higher than the first level, the second prime mover 1032 may resume providing power for the generator 1006 or 1016, the clutch between the engine 1002 and second prime mover 1032 may be opened, and the engine 1002 may be turned off. Using the engine 1002 to only recharge the rechargeable energy system 1020 and maintain generation during the recharging process can be more efficient than constantly operating the engine 1002 to operate the generator 1006 or 1016. In addition, the engine 1002 may be placed under a heavier load during recharging, than would occur if the engine 1002 only moved the generator 1006 or 10016, resulting in higher exhaust temperature, which can result in lower NOx emissions because the exhaust is at a higher temperature allowing the after treatment to more effectively operate to reduce NOx.

In some embodiments, an optional high output generator mode can be used if the generator 1006 or 10016 requires extra power, more than can be supplied by the second prime mover 1032. In the high output generator mode, the first prime mover or engine 1002 may be started and synchronized as described above. Once both the second prime mover 1032 and the engine 1002 are working together to rotate the generator 1006 or 1016, additional power can be supplied to the generator 1006 or 1016. In some embodiments, such a mode of operation is beneficial during a surge in required generator output, and is another advantage over a solid state inverter that only draws power from the battery. If the second prime mover 1032 were to fail, or the system 1020 fails, the engine 1002 may operate the generator 1006 or 1016 alone, without power from the second prime mover 1032. Such a mode may be advantageous for applications that require higher reliability or redundancy.

In some embodiments, after providing generation power, the generator 1006 or 1016 may be turned off. There may be an optional clutch between the second prime mover 1032 and the generator 1006 or 1016, which may open to provide lower resistance for the second prime mover 1032, which can then be used to optionally assist in the propulsion of the vehicle 1000. Optionally, the second prime mover 1032 may continue to be coupled to the generator 1006 or 1016, and the generator 1006 or 1016 operated in low power or off condition, with relatively low resistance to rotation.

If the vehicle does not have access to grid charging or charging from an off-vehicle source, the engine 1002 recharges the energy system 1020 or 1022 to a higher state of charge than if the vehicle 1000 or micro grid were expected to recharge from the grid or other source. In some embodiments, vehicle 1000 does not include a grid interface and only recharges using power from the engine 1002 or regenerative braking. When driving back to a location with grid access, the vehicle 1000 may use electric power for propulsion, such that the state of charge is at a low level when recharged by the grid, maximizing fuel efficiency given the amount of energy stored on the vehicle 1000. In some embodiments, an algorithm or telematics connected control system may optimize charge depletion, charge sustaining and charge depletion to maximize overall efficiency depending upon how much power is expected to be generated, how much distance is expected to be driven and how much power is desired during driving.

In some embodiments, the generator 1006 or 1016 is mounted external to the transmission 1008. In such a configuration, generator 1006 or 1016 may be easier to maintain and the generator 1006 or 1016 may be swapped for different generators with different power, frequency and/or voltage characteristics to best match the power required. In some embodiments, the control system queries generator 1006 or 1016 for power, frequency, and voltage characteristics or generator type for configuring RPM levels and energy system 1020 for the particular type of generator 1006 or 1016. In some embodiments, the user can select the characteristics of the generators 1006 or 1016, and the control system can adjust operation for the type of generators 1006 or 1016. The characteristics can also include speed or rpm rating, torque rating, etc. In some embodiments, the control system and generators 1006 and 1016 include smart circuitry and communication circuitry for communicating the characteristics and real time operating parameters (e.g., power demand, speed, etc.) so the control system can make operating adjustments.

Vehicle 1000 can be used to drive backup generators for houses, buildings, facilities, micro grids and grids using power from second prime mover 1032 in some embodiments. The second prime mover 1032 is coupled or uncoupled from engine 1002 when vehicle 1000 is stationary (e.g., via clutches). In such a configuration, the external generator can operate from the second prime mover 1032 that draws power from a rechargeable energy system 1020 when the engine 1002 is off. The engine 1002 is turned on if system 1020 is low on energy, and the engine 1002 is synchronized with the second prime mover 1032 so that upon engagement of the clutch there is a small, very little, or no change in the rpm of the external generator. The engine 1002 operates the external generator and optionally recharges the system 1020 using the second prime mover 1032. Similarly, if a facility has surge in required power, both the engine 1002 and the second prime mover 1032 may be operated if sufficient energy is in the energy system 1020. After the energy system 1020 is recharged to a desired level, the engine 1002 for the external generator maybe turned off. The second prime mover 1032 and the engine 1002 (*rpm*) are controlled to minimize a change in generator rpm (e.g., 3600 rpm) for producing steady, stable power. In some embodiments, energy source 1020 or system 1022 is recharged by the grid or renewable energy source, such as solar, to minimize fuel use and avoid high grid energy costs if recharging was performed off peak. System 1001 is used with an existing engine driven generator, handles high loads, such as occur in industrial applications when motors start, and avoids the use of very expensive high power DC/AC converters in some embodiments.

In some embodiments, second prime mover 1032 is connected to a PTO to recharge the system 1020 and optionally provide propulsion and a third prime mover (e.g., electric motor) rotates a generator 1006 or 1016 for export power. Such a configuration provides advantages where packaging is limited and the generator 1006 or 10016 must be located in another part of the vehicle 1000. In some embodiments, second prime mover 1032 and the third prime mover are configured to rotate independently. In some embodiments, another electric motor coupled to another PTO or other electric motors, such as an e-axle, could be added to provide more propulsion.

In some embodiments, vehicle 1000 is an EV, a fully electric vehicle, which provides export power for tools, power for facilities, or other purposes. As an example, vehicle 1000 stores DC power at over 300V provides export AC power at 120V and 60 Hz via generator 1006 or 1016, which are rotated by a second prime mover that receives power from the battery system that propels the vehicle, or a battery system dedicated to export power and not used for propulsion, or both. Such a configuration is advantageous when supplying export power at higher power levels, or where it is desirable to isolate the export power from the vehicle 1000, or where large sudden loads, such as electrical motors need to operate. In some embodiments, vehicle 1000 is an EV which operates hydraulic pumps or other rotational loads, other than parts of the vehicle required for propulsion. In some embodiments the second prime mover rotates a pump or a compressor. An additional electric motor drawing power from the source 1020 may be used to rotate the pump. In some cases an inverter will be needed to create AC power from the DC battery power to operate an electric motor to rotate the pump.

In some EV applications, vehicle 1000 is configured to have a separate energy storage system for the electric motor or motors that operates the hydraulic pump or pumps (or other load, such as a compressor or generator). The electric motors may also be second prime movers. The second prime movers may rotate generators to provide alternating current or direct current of a specific voltage. In some embodiments, inverters receive power from the separate energy storage system and export it to power tools or equipment that require alternating current. The inverters may provide 6 kW or 12 kW, or more, of alternating current, such as 120V single phase, 240V single phase, 208V three phase, or 480V three phase. The system may output electricity in other voltages and currents. If a DC/DC converter is used, the system may output DC power at certain voltage level, such as 600V. In some embodiments the system may draw from system 1020 or the traction battery to provide vehicle to grid (V2) power, in which the electrical output is synchronized with the voltage and frequency of the grid. Such V2G power output may be controlled by control systems that detect faults in the circuit to insure safe operation. The energy system 1020 is a battery system including the traction battery and other batteries or electrical storage units The benefits of using an independent energy storage system or unit within system 1020 (separate battery) for the accessories (such as the hydraulic pump that may operate a crane or generator) or for export of electricity include the ability to isolate faults that may be introduced by equipment added to the vehicle, from the propulsion battery, providing higher reliability for propulsion. In some situations, manufacturers of the propulsion system may not allow other devices to receive energy from the traction battery used for propulsion. The user may also want to keep energy storage systems separate so that propulsion energy is not drawn below a certain level, regardless of the worksite energy requirements. In some embodiments, the independent energy storage system operates at voltage levels that are well suited for small electric motors operating pumps as opposed to vehicle propulsion. In some embodiments, a modular battery system is used to operate accessories on the vehicle 1000, such as vocational truck EV. The modular battery may have its own dedicated on-board charger to recharge from the grid. Optionally, the battery to power the accessory may draw power from the main propulsion battery during recharging or at the worksite.

In some embodiments, the DC to DC converters may be used to transfer energy between the battery powering equipment or exporting power from the vehicle to power tools or other loads and the battery used for propulsion. As an example the battery for export power or power for accessories such as hydraulic pumps or compressors may have a lower operating voltage of less than 60v, such as 12V, 24V or 48V. The battery for export power and operation of electric motors that rotate hydraulic pumps or compressors might alternatively operate at higher voltages over 100V, such as 350V. Traction battery for propulsion may have a higher operating voltage of 600V or 900V. The higher traction battery voltage may increase the cost of electric motors needed to rotate pumps and compressors on the vehicle. The pumps and compressors on the vehicle may provide power for equipment, such as hydraulic equipment, mounted to the vehicle that enables personnel to work at a jobsite. The higher traction battery voltage may also increase the cost of export power inverters that supply AC power for tools. The traction battery may be matched to the propulsion system, but the interface between the battery (for the accessories) and the accessories may have a standardized interface to make it easy to use a variety of different electric motor combinations for various hydraulic pumps or other worksite loads, including export power. The lower voltage of the battery system for accessories and export power may reduce the cost of electric motors and export power inverters connected to the lower voltage battery that is 500V or less, such as 48V or 350V, providing an advantage over a direct electrical connection with the higher voltage traction battery that primarily supplies power to propel the vehicle. Optionally, the battery for accessories or system 1020 for truck mounted accessories may have the capabilities to provide power to the main traction battery through a DC/DC converter. Since the battery for accessories operates at a lower voltage that the traction battery, a DC/DC converter can allow the lower voltage battery for accessories (example, 48V or 350V) receive power from the higher voltage battery (example, 900V) battery use for propulsion. Optionally, the lower voltage battery for accessories can supply power to the higher voltage traction battery. Some DC/DC converters can operate bi-directionally in a buck-boost converter providing a means for either the battery for powering accessories (such as pumps, compressors, or export power) or the battery for powering vehicle movement to supply the other with power. Other converters only operate in one direction. In some embodiments, the DC/DC converter operates in a buck-boost mode to move power between the lower voltage battery that powers tools and equipment and the higher voltage battery that provides power for propulsion. Such an interface may be useful if the propulsion battery requires extra energy for additional propulsion range, or if a fault has reduced capacity in the propulsion battery system. In some embodiments the DC/DC converter only provides power in one direction, such as from the higher voltage battery for propulsion to the lower voltage battery that supplies power for tools, pumps or export power. Such an interface is advantageous if the vehicle does not deplete the traction battery as much as the battery for accessories. Some vehicles drive short distances but use most energy operating equipment on the vehicles at a jobsite while the vehicle is stationary. Allowing power to be transferred from the higher voltage traction battery to the lower voltage for accessories provides benefits such as reducing the size of the accessory battery. In some embodiments, the DC/DC can supply power directly to the loads, such as export power system, an electric motor to operate a hydraulic pump or an electrical motor to rotate a compressor, such as a compressor that supplies air to a jack hammer or other requirements for air at a work site. In some embodiments the DC/DC converter supplies power from the higher voltage traction battery (example 900V) to an electric motor or export power inverter without any battery to store energy and provide power for export power, pumps or compressors. The removal of the battery for accessories reduces cost. In some embodiments, the system that provides power for accessories (such as pumps, compressors and export power) can operate using power from the DC/DC by supplying power from the traction battery directly to the accessories, or inverters that operate those accessories, that operate at lower voltages, even if the there is a battery for accessories. Such operation may be beneficial if the battery for accessories has a fault that causes the battery system for accessories to not be able to supply power, or the battery for accessories is not capable of supplying sufficient power alone. Charging of the energy storage system for accessories, one or more batteries, can be performed by using a grid interface that is connected to the vehicle. An on-board charger on the vehicle, such as a charger that converts grid power at as an example, 120 VAC or 240 VAC, to DC power required to recharge the battery for accessories can be used. In such situations, the vehicle may have two inlets to receive power from one or more Electric Vehicle Supply Equipment (EVSE) that may conform with J1772 or other standards applying to the recharging of vehicles mounted batteries. In one embodiment, a DC fast charger may supply power for the higher voltage battery used for propulsion (as an example, operating at 900V), and a Level 1 or Level 2 EVSE may supply power to the lower voltage battery that powers accessories (as an example, operating at 350V or 48V). In some embodiments, a DC/DC converter supplies power from the high voltage traction battery to the lower voltage battery for accessories during grid charging of the high voltage battery, eliminating the need for the charging inlet that is dedicated to supplying recharging power to the lower voltage battery for accessories. Such as system is beneficial due to the elimination of one charging port, the need for only one EVSE near the vehicle for recharging and the simplification afforded to the operator by only having to connect on grid based charger to the vehicle. During charging of the vehicle, the lower voltage battery for accessories may supply power for a DC/DC converter that recharges the chassis low voltage battery (such as a 12 V battery) that powers chassis electronics. A DC/DC converter between the lower voltage battery for accessories (example operating voltages of 350V or 48V) and the chassis low voltage battery (example operating voltages of 12V or 24V) that supplies power for chassis components related to propulsion, may be used when the vehicle is moving or stationary to keep the low voltage chassis battery at the proper energy or voltage level. The use of the DC/DC converter between the lower voltage battery for accessories (48V or 350V as an example) and the low voltage battery for chassis electronics (12V or 24V as an example), is especially beneficial when an electric vehicle is stationary and operating for many hours. Often there is a load for vehicle lighting at a work site that is powered by the chassis battery, and the DC/DC converter helps to maintain that battery's energy so that it is fully functioning and properly charged when it needs to provide power for chassis electronics that propel the vehicle. In some embodiments, a control system will monitor one or more of the traction battery available capacity, the battery for accessories and its capacity and the chassis low power battery for chassis electronics, such as those dedicated to the propulsion system. The control system may monitor energy use and power use of one or more of the batteries (such as the traction battery, battery for accessories, and chassis battery) to control how much power should be shifted between batteries to optimize total operational time and the capability to perform all vehicle functions, such as sufficient driving range and sufficient energy for stationary work operations. As an example, if the control system determines that the traction battery may have insufficient energy to achieve a desired driving range and the battery for accessories has more energy than needed, then the control system may shift energy from the accessory battery to the traction battery.

With reference to FIG. 1B, vehicle 1050 is similar to vehicle 1000 and includes heat engine 1002 (e.g., a CAT C7 engine), transmission 1008 (e.g., an Allison transmission), component 1004 (a power take off with a clutch), generator 1006 (e.g., a 60 kW generator (single or three phase)), second prime mover 1032, an inverter 1052 (e.g., 6 kW or 12 kW, 120 V or 240v DC/AC converter) and an energy system 1020. Energy system 1020 and is coupled to generator 1006 and inverter 1052 in some embodiments. In some embodiments Energy system 1020, such as a lithium ion battery, is charged by an AC permanent magnet electric motor generator or an induction motor by converting the alternating current to direct current through an inverter. In some embodiments, generator 1006 is a generator that provides DC power. Prime mover 1032 and engine 1002 drives generator 1006 as discussed above. Vehicle 1050 has the ability to simultaneously export power from the second prime mover 1032 powered generator 1006 while also exporting power from the inverter 1052 connected to the energy system 1020. Vehicle 1050 also has the ability to export power while the vehicle 1000 is in movement using the inverter 1052 connected to the energy system 1020 while the second prime mover 1032 charges the power system 1020 via component 1004. The exported power can be provided to a trailer or other unit electrically coupled with vehicle 1000 or 1050 or wirelessly from vehicle 1000 or 1050.

In some embodiments, vehicle 1050 also has the ability to export power while the vehicle 1050 or engine 1002 is in movement using the inverter 1052 connected to the energy system 1020 while the second prime mover 1032 charges the power system 1020 via component 1004 provided that there is battery capacity available. Vehicle 1050 or 1000 can also use one or both of generators 1006 and 1016 to provide high export power while the vehicle is moving. A clutch between the engine 1002 and the second prime mover 1032 is open (disconnected), such as the clutch within a PTO. With the clutch open, the second prime mover 1032 then operates a certain RPM needed to rotate the generator at a constant RPM. The first prime mover 1032 then operates at different rpm that are needed to propel the vehicle 1000 or 1052, such as when a diesel engine operates at different rpm as it accelerates and provides power to the transmission 1008. If the energy system 1020 becomes low while the vehicle 1000 or 1050 is in motion, the generator 1006 or 1016 may be disconnected by a clutch between the second prime mover 1032 and the generator 1006 or 1016. The second prime mover 1032 then synchronizes rpm, adjusting for a possible ratio of input and output speed of the PTO, with the engine 1002. Then the engine 1002 simultaneously propels the vehicle 1000 and 1050 while also recharging the batteries through the second prime mover 1032. Once the batteries are at a state of charge that is sufficient to operate the generator 1006 or 1016, the clutch in the PTO (e.g., component 1004 or 1014) can be opened. The second prime mover 1032 can then be stopped. The clutch between the generator 1006 or 1016 and the second prime mover 1032 can then be closed (connected) and the second prime mover 1032 can start to rotate the generator 1006 or 1016 again at the needed RPM to generate electrical power of a certain frequency (if AC power). If DC power is produced by the generator 1006 or 1016, the RPM may fluctuate, so that the clutch in the PTO and the clutch between the second prime mover 1032 and the generator 1006 or 1016 could remain closed (connected) as the engine 1002 operates at different RPM. A controller or control system can be used to control the clutch and speeds of prime mover 1032, and engine 1002 as set forth above.

In some embodiments, a constant speed drive (CSD) is disposed between the engine 1002 and second prime mover 1032, or between the second prime mover 1032 and the generator 1006 or 1016. The CSD takes the input shaft that rotates at a wide range of speeds and delivers the power though an output shaft at a constant speed. The constant speed output is then connected to the generator 1006 or 1016 to provide a speed of rotation that varies very little (almost constant) to produce voltages and frequencies of AC power that vary very little. An advantage of the CSD or operating a DC generator connected to the second prime mover 1032 that is coupled to the engine 1002, is that the second prime mover 1032 can vary its rpm to provide additional power to the engine 1002 or provide regenerative braking when the vehicle 1000 or 1050 is in motion while still providing export power while the vehicle 1000 or 1050 is in motion in some embodiments.

Inverter 1052 can provide AC energy using energy from energy system 1020. The AC energy can be used to provide power for tools, for vehicle loads, and for off vehicle loads.

Power for energy source 1022 can be provided by operating engine 1002 and driving generator 1006 or other generator, by operating second prime mover 1032 and driving generator 1006 or other generator, by operating second prime mover 1032 and engine 1002 and driving generator 1006 or other generator, or by receiving power from an off vehicle source (e.g., from AC/DC converter 1028). It is noted that the term motor as used herein refers to a motor/generator or motor/pump and is not limited to a device that performs only motor operations.

According to some embodiments, inefficiencies are reduced during regenerative braking by disconnecting the engine 1002 from the system 1001 when vehicle braking occurs. In some embodiments, the accessories (e.g., hydraulic pump, pneumatic pump, electric motor, etc.) can be powered singly or in any combination by the engine 1002, the second prime mover 1032, energy from braking, or energy stored in a second rechargeable energy source (e.g., battery, ultra capacitor hydraulic accumulator, etc.). The presence of a second rechargeable energy source also can obviate the need for a complicated pump control system when the accessory is a hydraulic pump. If the pump is a variable volume displacement pump, further simplification is possible because a clutch may not be needed between the second prime mover and the pump. Other types of pumps can also be used. According to some embodiments, with a clutch between the second prime mover and the hydraulic pump, the pump can be an inexpensive gear pump.

In some embodiments, the control system or alternatively, a controller, such as a transmission controller, may send requests for reduced torque to the controller for the engine 1002, while sending requests for greater torque to the second prime mover 1032. Energy for the second prime mover 1032 may be provided by a stored energy system, such as a battery system or ultra-capacitor, or hydraulic accumulator. In one example, the energy may be provided by a Li-Ion battery system that can be recharged by the grid or other means.

Figure 1C:
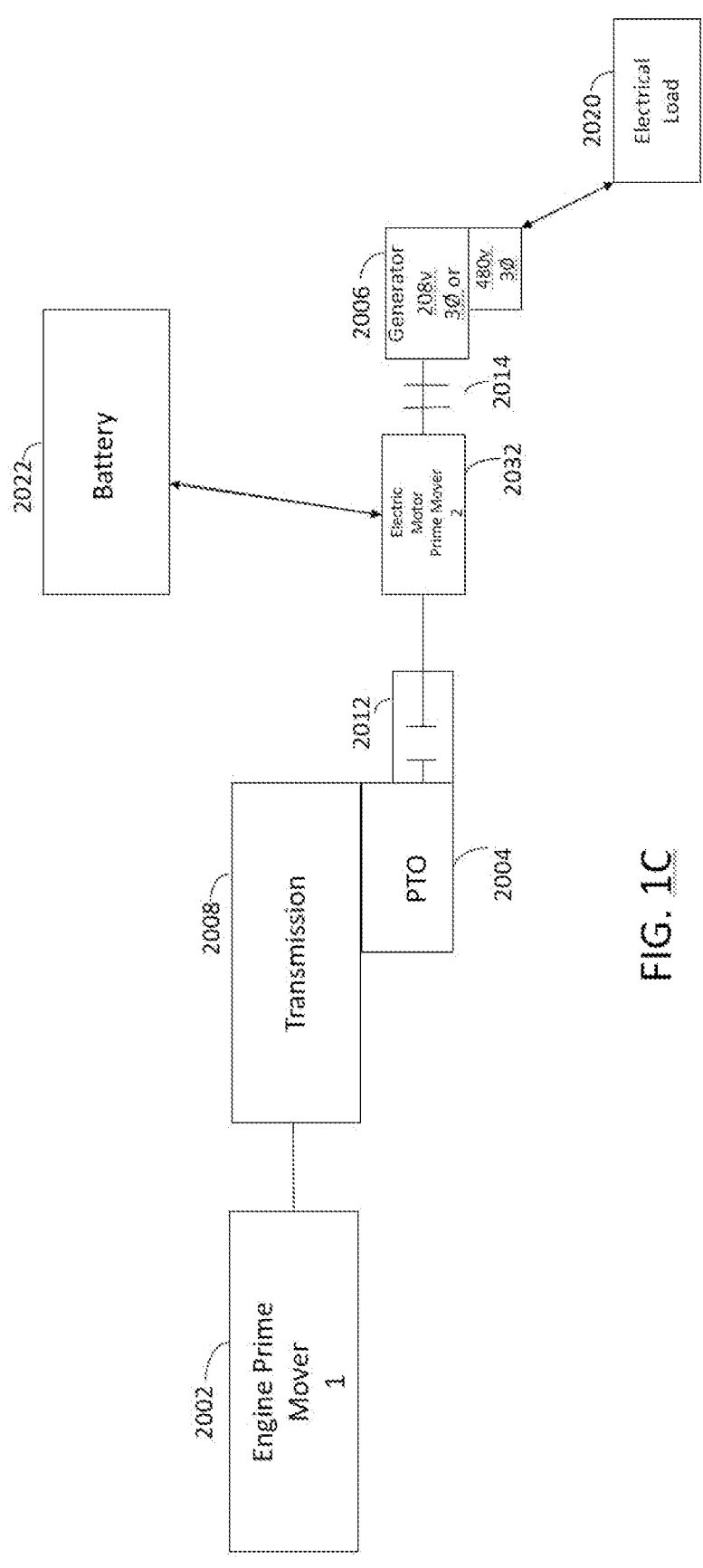
FIG. 1C is a general block diagram of a hybrid vehicle drive system according to a still further exemplary embodiment

With reference to FIG. 1C, a vehicle, similar to vehicles 1000 and 1050 includes a prime mover 2002 such as a CAT C7 engine, a transmission 2008 (e.g., an Allison transmission), a component 2004 (a power take off with a clutch 2012), a generator 2006 (e.g., a 208 V, 60 kW or a 480 V, 60 kW generator (single or three phase)), a clutch 2014, a second prime mover 2032, and an energy system or battery 2022. Battery 2022 is coupled to second prime mover 2032 in some embodiments and can receive energy from second prime mover 2032.

In some embodiments, clutches 2012 and 2014 are provided serially with generator 2006, components 1004 and, second prime mover 2032. The second prime mover 2032 can rotate generator 2006 and be mechanically separated from component 2004 when clutch 2012 is disengaged. The generator 2006 can receive power from transmission 2008 or prime mover 2002 through component 2004, clutch 2012, prime mover 2032 and clutch 2014 when clutches 2012 and 2014 are engaged. Second prime mover 2032 is coupled to clutch 2012 by a mechanically dampened shaft in some embodiments. Generator 2006 is coupled to clutch 2014 by an insulated shaft in some embodiments to provide export power that can be electrically isolated from the vehicle. Second prime mover 2032 uses power from the battery 2022 to drive or mechanically rotate generator 2006, thereby providing quieter operation, idle reduction, instant start, and fuel savings.

In some embodiments, the electric prime mover 2032 is disconnected from generator 2006 via clutch 2014 when power is not needed from generator 2006. Generator 2006 provide output power to load 2020 which is a fast charger (as an example, a 480V 3 phase AC to DC charger with a 3650 VDC output). In some embodiments, battery 2022 can be coupled to the grid or other power source and receive power from the grid or other source while providing power to drive generator 2006. In some embodiments battery 2022 provides power for electric motor prime mover 2032 which rotates generator 2006 which provide 480V three phase or other current and voltage needed by a bi-directional DC fast charger to charge an electric vehicle. In some embodiments the bi-directional DC fast charger can be mounted to the vehicle and configured to receive input from the grid to directly charge battery 2022 or receive power from battery 2022, helping to provide power to the grid without use of generator 2006. Such a connection between battery 2022 and optional bi-directional DC fast charger may provide vehicle to grid functionality that is mobile, since the bi-directional DC fast charger is mounted to the vehicle. In some embodiments, second prime mover 1032 or 2032 provides propulsion and drives generators 1006 and 1016 or 2006. The control techniques discussed herein can be used to operate vehicle 2000 in the modes discussed herein in some embodiments.

In some embodiments, a second PTO can be mounted to transmission 2008, and operate with components that are similar or the same as components 2004, clutch 2012, second prime mover 2032, clutch 2014, and generator 2006. Transmission 2008 has the ability to interface with more than one PTO in some embodiments. By using two PTOs, more power can be generated by the vehicle 2000 by directing power to two generators, one connected to one PTO and the other generator connected to the other PTO. For a vehicle with two or more PTOs (Power take-offs), the electric motors, one for each PTO, can both receive power from battery 2022, or optionally recharge battery 2022. In yet another embodiment, each electric motor (one is shown as 2032) can be connected to a separate battery 2022.

Clutch 2014 can be opened or disengaged to disconnect generator 2006 when power is not needed from generator 2006 and electric motor or second prime mover 2032 can recharge battery 2022 by operating as a generator for charging energy source or battery 2022 when engine or prime mover 2002 is operating and during regenerative braking. In some embodiments, source or battery 2022 can be coupled to the grid or other power source and receive power from the grid or other source while providing power to drive generator 2006. In some embodiments, generator 2006 can be motors/generators configured to provide propulsion for vehicle 1000 and motion for a hydraulic pump or other accessory/tool as well as generate energy for energy system or battery 2022. In some embodiments, second prime mover 2032 provides propulsion and drives generator 2006 and can optionally power accessories such as hydraulic pumps and compressors.

Referring to FIGS. 2-8, hybrid vehicle drive systems 10 according to several exemplary embodiments are shown. Embodiments of system 10 can include series parallel configurations in which prime mover 20 and the second prime mover 50 are coupled via the flywheel/crankshaft though a gear or other means, while a clutch resides behind the flywheel or gear that connects the prime mover 20 and second prime mover 50. A third prime mover can be attached to the PTO that is coupled to the pump portion or turbine section of transmission 30 (e.g., in an automatic transmission embodiment).

The system can be the same hybrid system as shown in FIG. 1-5, 7, 9-11, 13, 14, 15, 18, 19, 20, in U.S. patent application Ser. No. 12/130,888 (incorporated herein by reference in its entirety) unmodified or modified to have an interface 41 according to certain embodiments. In an Allison 3000 or 4000 series transmission (or any other transmission in which the PTO gear in transmission 30 is "live", (e.g., coupled to the crankshaft of mover 20)), advantages can be achieved if component 40 is instead connected to a gear (or other means of mechanical power connection) with the crankshaft or flywheel that is located between prime mover 20 and the transmission 30. In FIG. 6 of U.S. patent application Ser. No. 12/130,888, a gear can be coupled to a shaft between the clutch 165 and transmission 30 in one embodiment. The gear interfaces with component 40, instead of having component 40 interface with transmission 30. Component 40 can be a front mounted or rear mounted PTO.

Figure 2A:
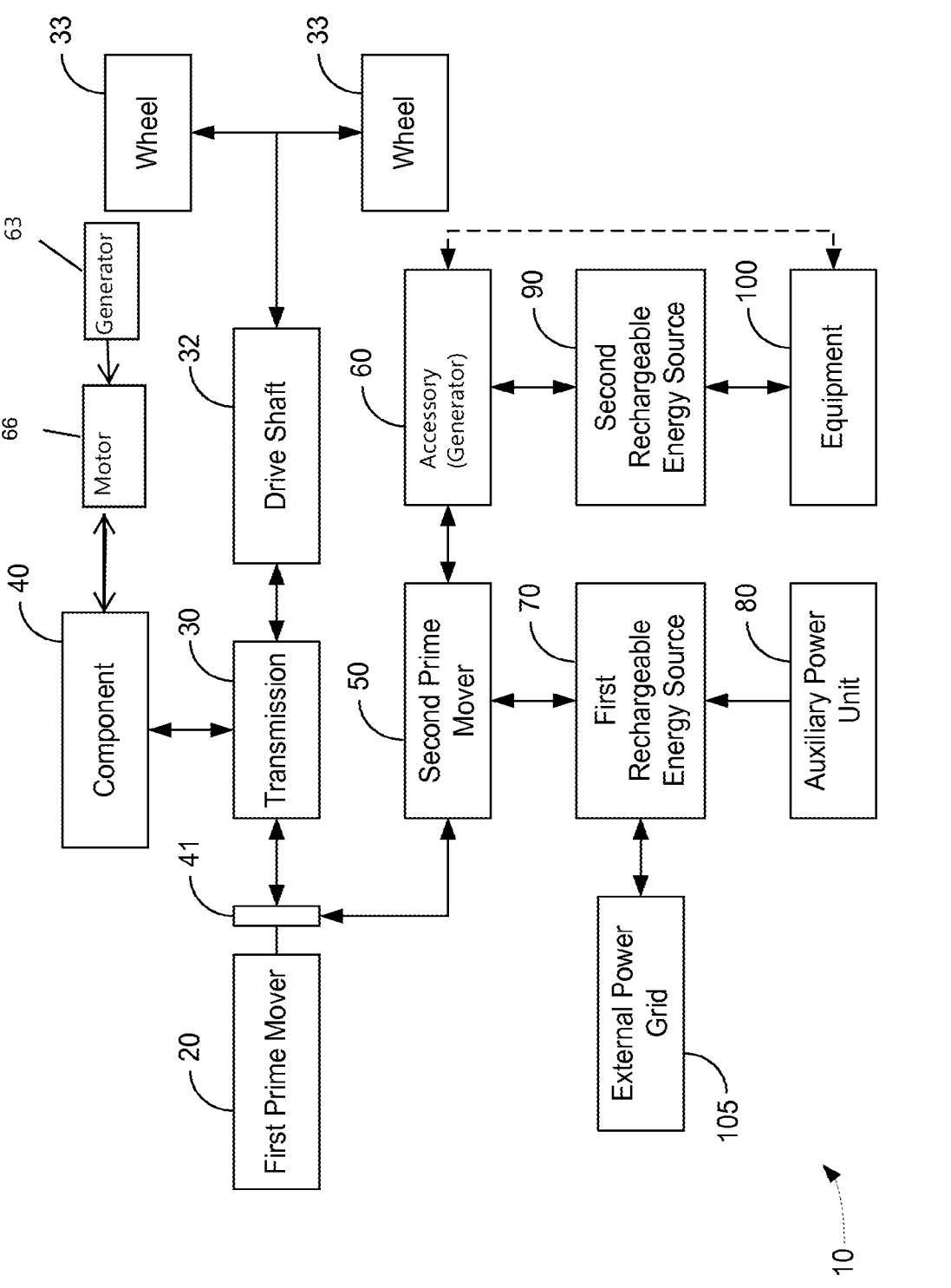
FIG. 2A is a general block diagram of a hybrid vehicle drive system according to another exemplary embodiment.

As shown in FIG. 2A, an exemplary embodiment of a hybrid vehicle drive system 10 can be employed on any type of vehicle and can be similar to vehicle 1000. As discussed with reference to FIG. 5, the vehicle associated with system 10 can be a tracked vehicle, a tractor, or construction equipment (e.g., a military vehicle, loader, backhoe, paver, steam roller, road roller, roller-compactor, skid steer, fork-lift, excavator, mini-excavator, track crane, bull dozer, etc.).

System 10 includes a first prime mover 20 (e.g., an internal combustion engine, such as a diesel fueled engine, etc.), a first prime mover driven transmission 30, a component 40 (e.g., a power take-off (PTO), a transfer case, etc.), a second prime mover 50 (e.g., a motor, such as an electric motor/generator, a hydraulic pump with a thru-shaft, etc.), an accessory 60 (e.g., a generator, a hydraulic pump, such as a variable volume displacement pump, etc.), a generator 63. Generator 63 is similar to generator 1006 and accessory 60 can be similar to generator 1016 (FIG. 1) in some embodiments. Generator 63 is driven by component 40 in some embodiments. In certain embodiments, accessory 60 can act as a third prime mover as described below. Transmission 30 is mechanically coupled to component 40 which is optional. Second prime mover 50 is coupled to accessory 60.

Interface 41 is disposed at a point between transmission 30 and prime mover 20. Interface 41 is preferably a bi-directional mechanical interface between second mover 50 and the point between mover 20 and transmission 30. Interface 41 can be various types of mechanisms for transferring power. Interface 41 is optional. As discussed above system 10 can have mover 50 coupled to component 40 as opposed to interface 41 in certain embodiments.

Interface 41 can be coupled between optional clutches disposed between mover 20 and transmission 30 as discussed with reference to FIGS. 2 and 3. In one embodiment, interface 41 is at a point before the transmission gear associated with the PTO or component 40 of transmission 30. In one embodiment, interface 41 can be a gear or similar device that interfaces with the crankshaft associated with prime mover 20 or a gear on a flywheel associated with prime mover 20.

Interface 41 can use gears, shafts, belts, or chains to engage second prime mover 50 to mover 20 and transmission 30. In one embodiment, a gear can be provided on the flywheel associated with mover 20. The flywheel can be on a front face of the housing of transmission 30 in one embodiment. The housing can be coupled to prime mover 20 in one embodiment.

The gear can be attached to a shaft which is in communication with the shaft of second prime mover 50 (e.g., via a pinion) in one embodiment. The gear can be designed to take additional torque (e.g., reinforced) over a conventional starter gear. In another embodiment, a starter gear on the flywheel may be utilized to provide interface 41. The gear can also be configured for continuous operation between mover 20, transmission 30 and mover 50.

In another embodiment, the gear is disposed on a crank shaft of prime mover 20 using a shaft and pinion in one embodiment. A clutch may be located between the pinion gear and the mover 50. In one embodiment, a shaft may connect mover 50 to the pinion. Optionally, the mover 50 or the pinion may have additional gears to allow mover 50 to rotate much faster than prime mover 20.

A gear or gear reduction set may be disposed between second prime mover 50 and accessory 60 in order for second prime mover to rotate much faster than accessory 60 in one embodiment. Accessory 60 can be a pump, blower, or other device requiring power but unable to rotate as fast as the second prime mover 50. The use of a shaft to directly or indirectly couple second prime mover 50 to pinion allows for additional packaging options. Second prime mover 50 may be an electric motor with a larger diameter that is better positioned behind or in front of the pinion or gear. Alternatively, prime mover 50 can be coupled to component 40 as described in the applications incorporated herein by reference.

Other advantages of positioning second prime mover 50 in a position that is not concentric with the crank shaft, include better control of the gap between the rotor and the stator. Further, second prime mover 50 is not subject directly to vibrations of the crank shaft, easier liquid cooling is enabled, and accessory 60 can be directly driven without incurring the parasitic losses associated with moving transmission 30 to operate a transmission-mounted PTO due to a non-concentric arrangement. An optional clutch located between second prime mover 50 and the pinion also permits second prime mover 50 to be disconnected from drive train when second prime mover 50 is not needed, thereby avoiding parasitic losses associated with rotating second prime mover 50 mounted around the crankshaft (in a concentric to crankshaft embodiment).

In another embodiment, interface 41 can utilize a ring gear, such as a ring gear utilized with a mixer which is continuously driven. The mixer can be a hydraulically powered mixer which is continuously driven. Alternatively, the ring gear can drive a variable flow pump. The use of the ring gear as interface 41 provides flexibility with respect to packaging and space which can be advantageous during retrofitting.

In one embodiment, the configuration using interface 41 expands the use of hybrid 10 system to numerous types of transmissions (automatic, manual, auto shift, CVT, etc.). By using a coupling between interface 41 and mover 50, it is not necessary to imbed mover 50 into the bell housing of the fly wheel, thereby reducing needed width between mover 20 and transmission 30. Interface 41 can be installed in an existing vehicle by replacing the gear on the crank shaft or fly wheel with a gear and linkage for coupling to mover 50.

Second prime mover 50 can also perform damping functions to offset the changes in angular velocity of the crankshaft that result in rough operation of the vehicle and transmission 30 in one embodiment. Prime mover 20 at low rpm can operate in a manner that results in high angular acceleration of the crankshaft as it rotates due to rough low speed operation of prime mover 20. Prime mover 20 can also employ cylinder deactivation to reduce fuel consumption at low loads, contributing to rough operation and higher frequency changes in the angular velocity of the crankshaft. By operating second prime mover 50 out of phase of accelerations created by prime mover 20, crank shaft can rotate smoother in one embodiment.

Other methods of operation of second prime mover 50 can provide electromagnetic damping. Such methods include but are not limited to control of torque of second prime mover 50 so that second prime mover 50 machine torque is out of phase of the prime mover engine torque ripple. A Li-ion battery system, or battery system with capacitor and/or ultra-capacitor may be utilized to store bursts of energy created as prime mover 20 accelerates second prime mover 50 during different phases of rotation. Rechargeable energy storage system 70, such as a battery, capacitor and/or ultra-capacitor system, can discharge energy to second prime mover 50 to accelerate prime mover 20 smoothing the rotation of crank shaft. The connecting shaft between the pinion and second prime mover 50 or the pinion gear itself may also or alternatively utilize mechanical means of damping, thereby reducing torsional vibration.

The use of mechanical damping methods on a shaft between a PTO and second prime mover 50 may also be used in other embodiments. Such methods may use a Lovejoy coupling, or other means to dampen torsional vibration and/or torque ripples. Same or similar means of vibrational damping may be used between other components in system 10, including but not limited to the interface between second prime mover 50 and accessory 60 in one embodiment, especially a compressor accessory and second prime mover 50 or the clutch disposed between second prime mover 50 and accessory 60.

A crank integrated starter/generation (C-ISG) configuration can be advantageous in one embodiment because one electric machine can be used to start the engine, to propel the vehicle, and to function as generator. In one embodiment, a crankshaft integrated starter generator C-ISG with the e-machine stator and rotor concentric to the crankshaft, can cause transmission 30 to be mounted further aft of prime mover 20. This configuration also does not necessarily allow the e-machine to directly power accessory 60 mounted via shaft (or directly) to second prime mover 20. A single clutch (e.g., clutch 52 in FIG. 3) can disconnect the e-machine from the crankshaft in a non-concentric configuration in comparison to a motor mounted concentric to the crankshaft configuration which would require two clutches in one embodiment. In one embodiment, auxiliary functions such as lubrication and HVAC are operated via energy from power source 70 to prevent wear and on/off cycling as mover 20 is started and stopped.

Mover 50 can be an electric motor such as an integrated starter/generator (ISG) in one embodiment. The ISG can be located at the location of a conventional starter.

According to one exemplary embodiment, second prime mover 50 is a 50 kW electric motor. The electric motor is preferably housed outside of the transmission/engine interface in one embodiment, thereby allowing more space for connection to accessory 60. When acting as a generator, second prime mover 50 may generate 30 kW continuously or as much as 75 kW at peak times. The above referenced power parameters are exemplary only. Second prime mover 50 may be further used to power various on-board components such as compressors, water pumps, cement mixer drums, etc.

In a preferred embodiment, accessory 60 is embodied as a hydraulic motor and includes a through shaft coupled to receive and provide power to interface 41 or mover 50. The through shaft can also be coupled to the shaft of the mover 50 embodied as an electric motor. In another embodiment, electric motor includes a through shaft that is coupled to the pump (e.g., accessory 60). Alternatively, linkage can be attached to the starter gear associated with mover 20. In another embodiment, a packaged fly wheel can replace the existing fly wheel. The packaged fly wheel includes gears and linkage for coupling to mover 50.

According to one embodiment, system 10 also includes a first rechargeable energy source 70 (e.g., a battery, a bank of batteries, a fuel cell, a capacitive cell, or other energy storage device), an Auxiliary Power Unit (APU) 80 (e.g., an internal combustion engine, possibly fueled by an alternative low emission fuel (e.g., bio-mass, natural gas, hydrogen, or some other fuel with low emissions and low carbon output), and a generator, a fuel cell, etc.), a second rechargeable energy source 90 (e.g. a hydraulic accumulator, ultra capacitor, etc.), and onboard or external equipment 100 (e.g., hydraulically operated equipment, such as an aerial bucket, etc.). First rechargeable energy source 70 is coupled to second prime mover 50 and provides power for the operation of second prime mover 50. First rechargeable (e.g., pressurized or rechargeable) energy source 70 may include other auxiliary components (e.g., an inverter provided for an AC motor, a DC-to-DC converter to charge a DC system, an inverter for power exportation to a power grid or other equipment, controllers for motors, a charger, etc.). APU 80 is coupled to first rechargeable energy source 70 and provides power to first rechargeable energy source 70. According to one exemplary embodiment, second renewable energy source 90 is a hydraulic system with a high pressure portion (e.g., an accumulator) and a low pressure component (e.g., a reservoir tank). In another exemplary embodiment, second renewable energy source 90 is a tank for storage of gas or fluids, such as a tank to store pressurized air. Accessory 60 may be any type of pump or compressor to pressurize or supply gas or fluid to the tank.

Second rechargeable energy source 90 is coupled to accessory 60 and provides stored power for accessory 60. Onboard or external equipment 100 can be coupled to accessory 60 or second rechargeable energy source 90 and operate using power from either accessory 60 or second rechargeable energy source 90. In one embodiment, onboard or external equipment 100 is coupled through second rechargeable energy source 90 to accessory 60. According to various exemplary embodiments, APU 80 may also provide power to both second renewable energy source 90 and first rechargeable energy source 70 when high hydraulic loads are required. APU 80 and second renewable energy source 90 may both provide power to hydraulically operated equipment 100.

Figure 2B:
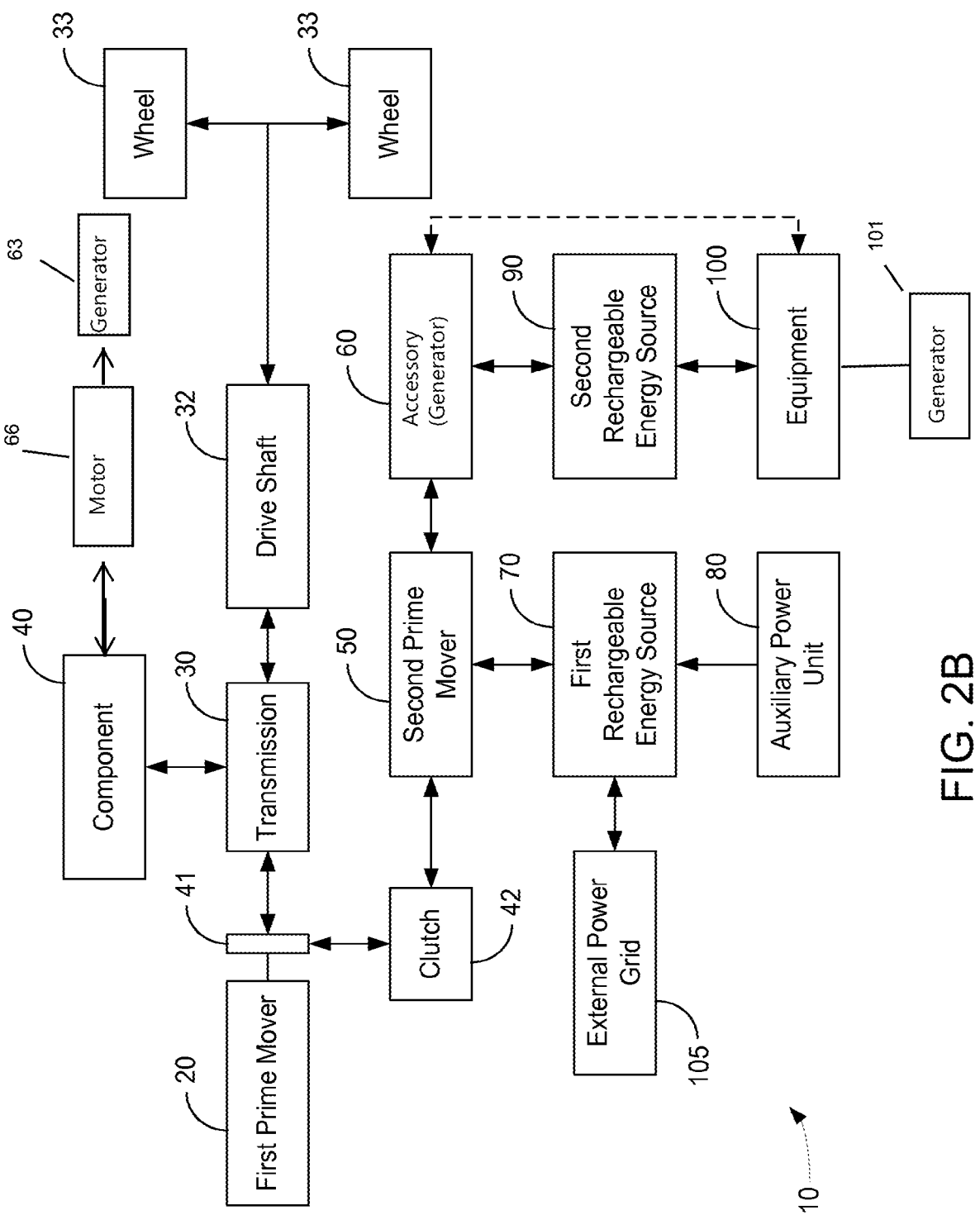
FIG. 2B is a general block diagram of a hybrid vehicle drive system according to an exemplary embodiment.
Figure 3:
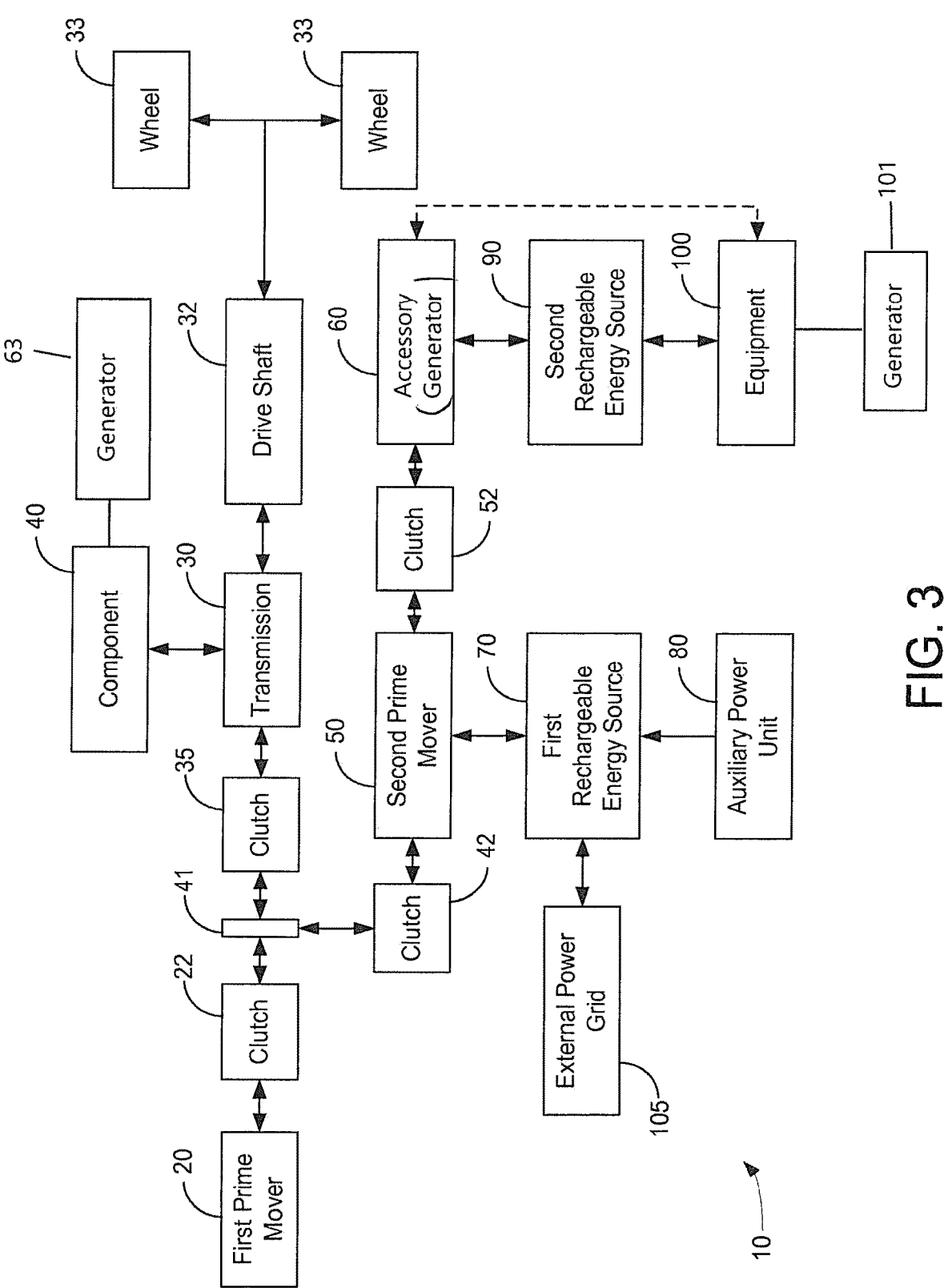
FIG. 3 is a general block diagram of a hybrid vehicle drive system according to another exemplary embodiment.

In one embodiment with reference to FIGS. 2B and 3, interface 41 is designed to be engaged or disengaged via clutch mechanisms or clutches 22, 35 and 42. Clutches 22, 35 and 42 are optional, one or more of the clutches may not be installed in the system. With reference to FIG. 2B, system 10 includes a clutch 42 disposed between prime mover 50 and interface 41 and generator 101 driven by equipment 100 embodied as an electric motor powered by grid 105 or energy source 90 embodied as a battery. With reference to FIG. 2A, generator 63 can be driven be an electric motor 66 driven by component 40 in some embodiments. With reference to FIG. 3, a clutch 35 is disposed between interface 41 and transmission 30 and generators 101 and 63 are included. Generator 101 is driven by equipment 100 embodied as an electric motor and generator 63 is driven by second prime mover 50, component 40, or a motor associated with component 40. In addition, a clutch 22 can be disposed between interface 41 and first prime mover 20. The use of clutches 22, 35 and 42 allow components to be driven without driving additional portions of system 10 or the vehicle. For example, in idle reduction modes, prime mover 50 can drive accessory 60 without driving interface 41, first prime mover 20 or transmission 30 by disengaging clutch 42. Similarly, prime mover 20 can drive prime mover 50 and be disengaged from transmission 30 via clutch 35. Use of clutch 22 allows prime mover 50 to drive transmission 30 without driving prime mover 20. A clutch 52 can be optionally disposed between mover 50 and accessory 60 to engage and disengage accessory 60. In one embodiment, the placement of mover 50 and accessory 60 can be exchanged.

In one alternative embodiment, second prime mover 50 can be placed on one side of a clutch (i.e. toward mover 20) and accessory 60 can be on the other side of a different clutch (i.e. toward transmission 30). Shafts may connect the prime mover 50 and accessory 60 to the clutches. Gears maybe used along with the shafts to multiply the speed of the prime mover 50 and/or accessory 60. Prime mover 50 may operate more efficiently at a higher RPM than first prime mover 20 and/or accessory 60. A potential advantage of this configuration is the easier use of an end mount electric motor (rather than a thru shaft motor). End mount motors are typically easier to source (i.e. find and procure) and can be less expensive. Similarly, end mount accessories are easier to obtain and typically less expensive. A single housing for the mechanical interface to interface 41 and the clutches could be made. Optional support for the housing may be provided by the bell housing, end of transmission 30 or some other structure related to prime mover 20 or transmission 30.

Interface 41 can be directly coupled to mover 20, and transmission 30 in one embodiment. Alternatively, interface 41 may interface with transmission 30 in a way that directly couples interface 41 to a torque converter of transmission 30. The torque converter may be in mechanical communication with mover 20, but rotating at a different speed or may rotate at the same speed as mover 20 if it is locked up.

With reference to FIG. 2B, interface 41 can be disengaged from transmission 30 via a clutch 42 when first prime mover 20 exceeds the maximum operating RPM of any component connected through clutch 42. For example, clutch 42 or 52 can disengage mover 50 if first prime mover 20 exceeds the maximum operating RPM of accessory 60. Alternatively, all components connected through interface 41 can operate throughout the RPM range of first prime mover 20, and interface 41 can be engaged continuously. In a preferred embodiment, component 40 can be disengaged during high speed steady driving conditions to reduce friction and wear on system 10 from mover 50 by clutch 22. Upon optional reengagement of second prime mover 50, which may be initiated due to braking and/or speed dropping below a threshold, second prime mover 50 may be powered so that the rotational speed (rpm) at the clutch interface equals or is close to, the rpm of the other side of the clutch, so that upon engagement, wear on the clutch is minimized and first prime mover 20 and transmission 30 do not experience a change in RPM due to a momentary extra load caused by engagement of the clutch. A control system 14 discussed in U.S. application Ser. No. 13/812,373, incorporated herein by reference or VMCS 6 discussed in U.S. application Ser. No. 12/217, 407 incorporated herein by reference can control the rotational speed of prime mover to effect that minimization of change in RPM and control the RPM for generators 53, 63, or 101 or accessory 60.

In FIG. 2A, first prime mover 20 provides power to drive shaft 32 through transmission 30. Second prime mover 50 provides additional or alternative power to drive shaft 32 through interface 41 and transmission 30. Drive shaft 32 provides power to two or more wheels 33 used to provide forward and backward momentum to the vehicle. For example, second prime mover 50 can optionally provide the sole source of power to drive shaft 32. Alternatively, second prime mover 50 can provide additional power to drive shaft 32 during vehicle acceleration. When providing power to drive shaft 32, second prime mover 50 can operate using power from first rechargeable energy source 70. According to the various exemplary embodiments of system 10, first rechargeable energy source 70 can be charged or powered by second prime mover 50, APU 80 or another suitable source (e.g., the vehicle alternator, the power grid, etc.).

Figure 8:
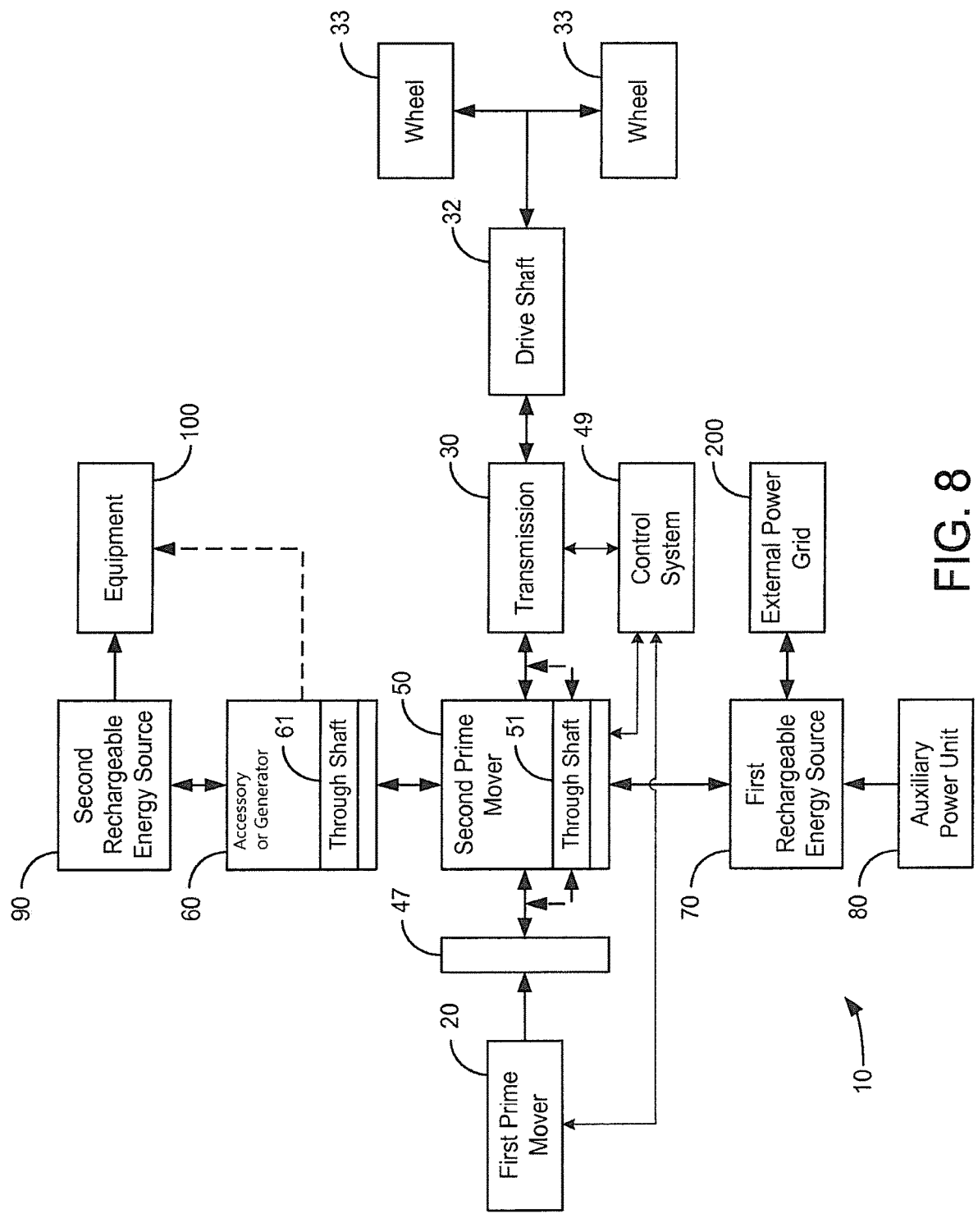
FIG. 8 is a general block diagram of a hybrid vehicle drive system according to another exemplary embodiment.

The use of prime mover 50 to provide power through interface 41 while interface 41 is engaged to prime mover 20 allows reduction in fuel consumption by mover 20 during operation as described below. In another embodiment, the use of prime mover 50 to provide power through component 40 (e.g., PTO) to mover 20 allows a reduction in a fuel consumption by mover 20 during operation as described below. In another embodiment, system 10 can be configured as shown in FIG. 8, and prime mover 50 between transmission 30 and prime mover 20 can provide power to mover 20 to reduce fuel consumption as described below. In yet another embodiment, system 10 can be configured in a hybrid series configuration and prime mover 50 can provide power to mover 20 to reduce fuel consumption as described below. For example, when vehicle 10 is stopped, power from second prime mover 50 or accessory 60 can increase the revolution per minute (RPMs) associated with prime mover 20, or can cause a reduction in needed torque of prime mover 20 if the RPM is at, or just slightly above, the RPM that the engine has been commanded to operate by a control system, such as an engine control module and/or transmission control module. Such an increase in the RPM of prime mover 20 results in reduction in fuel provided to prime mover 20, as a result of commands provided by the electronic control module (ECM) of vehicle 10, or commands provided by other control systems interfacing with prime mover 20. The reduction in fuel may be in response to the engine control system initiating de-fueling to try to slow the RPM of the engine. As an example, a similar reduction in fuel input into prime mover 20 may occur if the vehicle is going downhill and transmission 30 causes prime mover 20 to operate at a higher RPM. In response to the higher RPM of prime mover 20, the control system for prime mover 20 may command a reduction in power of prime mover 20, which results in a reduction or elimination of fuel used by prime mover 20. The reduction or elimination of fuel used by the prime mover 20 may be due to a reduction or elimination of the fuel supplied to the prime mover 20 by any of a change in operation of a fuel pump, fuel injector, valve, or other means. In spark ignited prime movers, the spark may also be turned off. In some cases, the transmission control module may send commands to the engine control system causing, enabling or commanding a reduction in fuel use by prime mover 20. The increased RPM is preferably controlled to be below a threshold so that drive shaft 32 does not begin forward operation in response to the increased RPM. In such configuration, system 10 advantageously reduces engine idle fuel consumption without requiring significant changes to the vehicle. Prime mover 20 may idle with cylinder deactivation technology. The deactivation of combustion in certain cylinders of an internal combustion engine may cause changes in rotational speed of the crank shaft, resulting in a rough idle. Use of second prime mover 50 to apply power to prime mover 20 may allow the engine to operate in a cylinder deactivation mode, saving fuel, or may allow the prime mover 20 to totally eliminate fuel consumption under some modes of operation, such as idle, acceleration and/or sustained motion of the vehicle. If fuel use is totally eliminated during idle, the crankshaft may not experience the changes in velocity associated with cylinder deactivation, resulting in a smoother, less varied rotational speed of the crank shaft. System 10 can use control system 14 discussed in U.S. application Ser. No. 13/812,373, incorporated herein by reference or VMCS 6 discussed in U.S. application Ser. No. 12/217,407 incorporated herein by reference to effect the idle fuel reduction as explained herein. Bumping or raising the idle rpm of prime mover 20, or inputting more torque than required to operate or rotate prime mover 20, provides an advantageous way of reducing aggregate consumption by prime mover 20 when vehicle 10 is stopped. Once the vehicle accelerator is pressed, the ECM provides fuel to prime mover 20 so that vehicle operates according to normal operation. The ECM can also reduce fuel consumption during travel when prime mover 50 provides power during travel and prime mover 20 is also engaged.

Such an increase in the RPM of prime mover 20 results in reduction in fuel provided to prime mover 20, as a result of commands provided by the electronic control module (ECM) of the vehicle, or commands provided by other control systems interfacing with prime mover 20. In some cases, the transmission control module may send commands to the engine control system causing, enabling or commanding a reduction in fuel use by prime mover 20. A controller, such as a hybrid control unit could send signals to the transmission controller and/or engine controller causing, enabling or commanding a reduction in fuel use by prime mover 20. Such signals may be torque requests sent by a master controller, or multiple controllers, to the first prime mover 20 and second prime mover 50, such that the sum of the torques from each mover meets required torque input into the transmission. Controllers monitoring the first prime mover 20 and second prime mover 50 may communicate bi-directionally with the master controller to communicate available torque from each prime mover. The method of summing torques was described in patent application 61/251,285 incorporated herein by reference and is especially beneficial in managing torque outputs so that the maximum turbine torque limit of an automatic transmission is not exceeded. The control system may adjust torque requests to each prime mover to minimize fuel consumption and emissions while meeting overall power and vehicle performance requirements. The hybrid controller can also communicate with transmission controller and/or engine controller to cause, enable or command the starting and stopping of prime mover 20, such as when the truck is stationary at a stop sign or signal or other event in which stopping prime mover 20 would be beneficial. Prime mover 20 may optionally be stopped in such a way or position as to more easily start the prime mover 20 after it has stopped. Such a method may optionally position crank shaft and cylinder position so that prime mover 20 may be started more easily, more quickly or instantly by injecting fuel into the cylinder. Prime mover 20 may be started using hybrid electric motor (e.g., mover 50) and may immediately begin consuming fuel to provide propulsion, or may initiate movement only using energy from rechargeable energy source 70 and then initiate combustion within prime mover 20 at a later time to transition to a blended mode of propulsion using both movers 20 and 50 upon an input for additional power or at a certain speed, or some other event. The hybrid controller could then command the hybrid system to provide no mechanical input above a certain speed, such as highway cruising speed as an example and may optionally disengage second prime mover 50 as described in the patent applications incorporated herein by reference to reduce the parasitic loads on the powertrain at high speed. The hybrid system may optionally synchronize second prime mover 50 with prime mover 20 and then reengage the mechanical interface when it can provide benefits such as the recapturing of brake energy or additional propulsion.

According to one embodiment, prime mover 20 can have idle speed control built into the ECU of mover 20. Idle speed is the rotational speed of mover 20 when the engine is uncoupled to the drivetrain and the throttle pedal is not depressed (generally measured in revolutions per minute, or rpm, of the crankshaft) of a combustion engine in certain embodiments. Setting the idle speed too slow can result in very low oil pressure when the engine is hot, resulting in faster wear and possible seizure. At idle speed, mover 20 generates enough power to run reasonably smoothly and operate its ancillaries (water pump, alternator, and, if equipped, other accessories such as power steering), but usually not enough to perform useful work, such as moving an automobile or truck in one embodiment. For a passenger-car engine, idle speed is customarily between 600 RPM and 1,000 rpm in some embodiments. For buses and trucks it is approximately 540 RPM or can be higher, such as 750 RPM, in some embodiments. The RPM of mover 20 is monitored by the crankshaft position sensor which plays a primary role in the engine timing functions for fuel injection, spark events, and valve timing.

Idle speed can be controlled by a programmable throttle stop or an idle air bypass control stepper motor in one embodiment. According to some embodiments, a carburetor-based prime mover 20 can use a programmable throttle stop using a bidirectional DC motor. Alternatively, throttle body injection (TBI) systems can use an idle air control stepper motor. Effective idle speed control anticipates the engine load at idle. Changes in this idle load may come from HVAC systems, power steering systems, power brake systems, and electrical charging and supply systems. Engine temperature and transmission status, and lift and duration of camshaft also may change the engine load and/or the idle speed value desired. Second prime mover 50 or a controller associated therewith can receive feedback associated with increased loads and increase speed to ensure that mover 20 is rotated at a speed above the speed where fuel is provided to mover 20, or provide sufficient torque to mover 20 such that prime mover 20 does not use any fuel to rotate and/or to operate. The feedback can be provided from sources including the ECM, bidirectional DC motor, stepper motor, injector systems, HVAC systems, etc.

In one embodiment, a full authority throttle control system may be used to control idle speed, provide cruise control functions and top speed limitation. If mover 20 is operating a large number of accessories, particularly air conditioning, the idle speed can be raised to ensure that mover 20 generates enough power to run smoothly and operate the accessories. An air conditioning-equipped vehicles 10 can have an automatic adjustment feature in the carburetor or fuel injection system that raises the idle when the air conditioning is running in one embodiment. In such situations, the control system can use the signal from the air conditioning system to increase the speed of prime mover 50. Alternatively, if the accessories that are driven by movement of first prime mover 20 can be operated at lower RPM, prime mover 50 may cause prime mover 20 to rotate at a speed that is below the RPM normally associated with the RPM of first prime mover 20 when fuel is used to idle prime mover 20. Such operation may require commands from the powertrain and/or engine control system to reduce or stop fuel flow during lower rpm mode of operation. Operating at a lower rpm may reduce the amount of energy needed to rotate first prime mover 20, allowing more energy in rechargeable energy source 70 to be used for propulsion or powering of other equipment, thereby increasing overall efficiency.

The exemplary embodiment can be used with any of the hybrid systems 10 described herein or in the patent applications incorporated herein by reference. For example, the embodiment can use an interface through the PTO to an Allison transmission ("live" PTO that is coupled to the crank shaft through transmission 30) or through an interface 41 with prime mover 20 (or in between prime mover 20 and transmission 30). Alternatively, the described method could be used by a powertrain having an integrated starter generator or other device to supply power to prime mover 20. The method might be used on any light-duty, medium-duty, heavy-duty, off-road vehicle or other vehicles and stationary power systems.

An exemplary operation is described below; other methods can also be used and not divert from the claims of the patent application. When the vehicle is traveling at highway speed of 65 mph, second prime mover 50 may be coupled to transmission 30 and provide propulsion assist (putting power into transmission 30) and/or provide regenerative braking (receiving power from transmission 30) dependent upon driver inputs and/or other inputs to the hybrid control unit and/or another control units of vehicle such as a transmission controller and/or engine controller. The vehicle may alternatively be traveling at highway speed of 65 mph and second prime mover 50 may be disengaged from transmission 30 or other interface with vehicle's crankshaft or driveshaft in order to reduce parasitic energy losses. The vehicle traveling at 65 mph may initiate regenerative braking upon a reduction in the request for power as detected by monitoring the position of the accelerator pedal, or through other means. If the accelerator pedal moves down, system 10 can use this along with other inputs to command second prime mover 50 to provide propulsion assist. Propulsion assist may be limited to a certain range of speeds. If the accelerator pedal moves up, system 10 can use this input along with other inputs to command the second prime mover 50 to provide regenerative braking. The hybrid controller or other controllers may command the transmission to retain torque converter lock-up, or other functions that control clutches within and/or external to the transmission to improve the effectiveness of regenerative braking.

As the vehicle slows, the transmission can be downshifted manually or through the commands of a controller (hybrid, transmission, engine and/or some other controller) to optimize the gear selection for the speed of the vehicle and other factors, such as load and/or driving preference (power or efficiency). As the vehicle slows, the ECM (Engine Control Module) or other controllers may command the reduction or total elimination of fuel flow to the engine (mover 20). Once the vehicle is stopped\ or is below a certain speed (example 5 mph), second prime mover 50 may be operated to either receive or provide power to the crankshaft of prime mover 20 in order to maintain the desired rpm of prime mover 20 with reduced fuel in comparison to the operation of prime mover 20 without a hybrid system, or second prime mover 50 may be operated to maintain the rpm of prime mover 20 with the elimination of fuel use by prime mover 20. Second prime mover 50 may be commanded to maintain the rpm of the prime mover 20 in order for accessories such as, but not limited to, power steering, braking, HVAC, oil pump and engine cooling to continue to operate without the consumption of fuel by prime mover 20. Second prime mover 50 may continue to provide power to the crankshaft of prime mover 20 during the duration the vehicle is stopped or the vehicle is operated at a reduced speed. Battery state of charge (SOC) and other diagnostics of the hybrid system may be monitored during the use of second prime mover 50, if the SOC drops below a defined threshold, the hybrid controller or other controller on the vehicle or combination of controllers may command prime mover 20 to operate using fuel and discontinue the use of prime mover 50. Alternately, the control system may command prime mover 20 and/or prime mover 50 to stop after a certain duration in which the vehicle has zero motion and the brakes are active. Transmission 30 may continue to stay in Drive during the aforementioned operating mode, or the control system (hybrid, transmission, ECM or combination or other) may command transmission 30 to be in neutral or in RELS (Allison mode of transmission operation, also referred to as reduced engine load at stop) to minimize the load on second prime mover 50 and/or prime mover 20 when the vehicle is stopped and the brake is applied. When the brake is released or moved up to a position of less brake force, the engine may be cranked using preferably prime mover 50 and/or a starter motor, if prime mover 20 is not already rotating at the desired rpm for low speed, idle operation. The vehicle may be commanded to continue to operate in an all-electric mode when the accelerator is depressed, indicating motion of the vehicle is desired. During this operation, the control system may command the fuel flow to the engine (prime mover 20) to be discontinued while second prime mover 50 operates to provide power to the crankshaft and may rotate the prime mover 50 to higher rpm depending upon the need for acceleration. Optionally, prime mover 20 may be operated at reduced fuel flow or normal fuel flow during acceleration or just before acceleration when the vehicle is stopped, but expected to begin to accelerate based upon changes to the inputs in the control system, such as the release of the brake and/or depressing the accelerator pedal. Once the vehicle has accelerated to a certain speed and/or the demand for power exceeds the capabilities of the power provided by prime mover 50 and/or the hybrid stored energy system has been depleted below a certain level, and/or another condition has been met, the control system may command prime mover 20 to use combustion to help move, or move the vehicle. This example is intended to demonstrate how the system can be operated to reduce fuel use during stopping and starting of vehicle motion. Other methods to reduce fuel can be used, such as using second prime mover 50 to increase the rpm of the engine above the idle set point of prime mover 20, so that the ECM or other controller discontinues or reduces fuel flow to the engine. Similarly, during acceleration, second prime mover 50 may be operated to exceed the commanded power from prime mover 20, resulting in reduced or discontinued fuel flow to prime mover 20. Optionally, if second prime mover 50 fails to provide the needed increase in RPM above idle set-points and/or commanded power of prime mover 20, the ECM may operate prime mover 20 by consuming fuel as normally commanded by the ECM. Such a method could allow prime mover 20 to operate normally if prime mover 50 fails or is not functioning. An optional brake override feature may be used to command second prime mover 50 to discontinue operation and/or for the hybrid system be disconnected from the transmission or crankshaft if the brake pedal is depressed below a certain level.

In order to lower emissions from the first prime mover, the method of operation of second prime mover 50 may be changed according to one embodiment. As an example, on a vehicle or stationary installation with a diesel engine (mover 20), the temperature of the exhaust from first prime mover 20 may need to be kept within a specific range to minimize harmful emissions. If the exhaust temperature is lower than or greater than the specified range, emissions may be elevated, or prime mover 20 and the emissions system may operate in such a way as to reduce overall efficiency but reduce emissions by dumping fuel into the exhaust in order to increase temperature in the after-treatment section. The control system of the hybrid may optionally monitor exhaust temperature and/or other diagnostic inputs from first prime mover 20 and the exhaust after-treatment of first prime mover 20. The inlet temperature of the diesel oxidation catalyst may be one of the parameters monitored. The control system then may cause second prime mover 50, which is coupled to the first prime mover in this mode of operation, to act as a generator in order to put the first prime mover under increased load. Placing additional load on first prime mover 20 causes the powertrain control system (ECM, or other) to increase the power output of the first prime mover 20 in order to maintain commanded RPM. The increased power output is typically associated with a rise in exhaust temperature, which may be desirable if exhaust temperatures were too low, such as shortly after a cold start or during operation under very low loads. Using the second prime mover 50 as a generator is beneficial since some of the energy used to improve exhaust emissions can be captured in the rechargeable energy source for later use to increase efficiency by reducing the need for fuel in other modes of operation. The use of second prime mover 50 as a generator powered by first prime mover 20 may occur during stationary and/or driving modes if used on a vehicle and maybe especially beneficial if the time to reach higher exhaust temperatures is reduced. The first rechargeable energy source 70 may optionally be recharged to a lower level than 100%, such as through grid recharging or other means, if it is anticipated that second prime mover 50 may be used as a generator soon after initiation of vehicle operation to accelerate or assist the process of reaching higher exhaust temperatures, especially during a cold start. The control system may continue to monitor exhaust temperatures and suspend or discontinue use of second prime mover 50 for the purpose of increasing exhaust temperatures if the temperature reaches the desired range. The system may also monitor exhaust temperature and adjust operation of second prime mover 50 in other modes of operation, such as during launch assist when both prime movers 20 and 50 are used to accelerate the vehicle, to maintain a sufficient load on first prime mover to minimize harmful emissions. This method may be particularly useful for diesel powered engines. The emissions generated by other fuels, such as some gaseous fuels, may be less adversely effected by exhaust temperature variations, and may be more suitable to stop/start operation of first prime mover 20. A supplemental device, such as an electrical heating element, to warm the catalyst or thermal insulation to better retain the heat within the catalyst may also be used to minimize the need for placing a load by second prime mover 50 on first prime mover 20. The method of operation of prime mover 50 and possibly of prime mover 20 may also be changed due to other factors, such as temperature of the passenger compartment and the possible need to provide heat. If an external or alternate heater is used, such as a fuel fired or electrical heater, the operation of prime mover 20, or use of fuel by prime mover 20, may not be needed to provide heat to the passenger compartment of the vehicle. If no alternative heater is available, prime mover 20 may be used and prime mover 50 may be operated to provide heat more quickly to passengers.

Optionally, transmission 30 can be controlled to reduce losses while stopped, such as the RELS (Reduced Engine Load At Stop) feature on an Allison transmission. The control system may verify that the brake is engaged (e.g. foot on brake, by monitoring brake pressure) before engaging RELS. If brake is released, the control system may make sure that transmission is not in RELS to prevent vehicle from moving backward on a hill.

One of the advantages to keeping prime mover 20 rotating without the use of fuel is that the oil pump continues to lubricate the engine. While system 10 could be used to stop and quickly start prime mover 20, the wear on prime mover 20 at start tends to be higher than at other operating modes. Moving prime mover 20 with second prime mover 50 and no fuel also continues to move transmission 30 (and transmission fluid pump) on an automatic transmission while continuing to power other important engine driven systems such as brakes, steering, HVACs, oil pump, etc.

When transmission 30 is in first range and this function is enabled, the ECM automatically commands transmission operation at a reduced load state which is similar to neutral in one embodiment. In one embodiment, conditions for enabling the function are:

vehicle is at a stop;

service brakes are applied; and throttle position is low.

In one embodiment, RELS is disabled when the throttle is advanced, Drive is selected at the shift selector, or the request circuit is switched open—which will occur if the service brakes are released, the dash enable switch is opened, and/or an additional optional interlock (i.e. door switch) is opened. If an Automatic Neutral input function is enabled while RELS is in an active state, RELS will be disabled.

A service brake pressure switch can be included in the activation circuit for this function in one embodiment. The location of this switch can be critical to the disabling of RELS each time the service brakes are released during normal driving cycles in one embodiment (to minimize the potential for vehicle roll-back if the feature is activated when the vehicle is stopped on an incline). Optionally, the signal may be digital based upon release of the brake, as provided on a CAN bus or other communications method.

Preferably, system 10 reduces heat load in the transmission in high start/stop duty cycles, improved fuel economy by reducing engine load when the vehicle is at a stop, and provides a diagnostic interface.

Motor or mover 50 can be utilized to crank prime mover 20, raise or bump the idle, help accelerate and brake the vehicle. The optional clutch 52 between prime mover 50 and accessory 60 can be engaged if accessory 60 is continuously needed such as in a hydraulic powered mixer or when accessory 60 is a variable flow pump. Mover 50 can power accessory loads such as AC, brakes, steering, etc. using power from first regenerative source 70 in one embodiment. Powering accessory loads via mover 50 increases efficiency by removing loads from prime mover 20. Under some circumstances, the torque needed to power accessories using mover 50 may be estimated or monitored in order to more accurately determine the torque available to operate first prime mover 20 and/or transmission 30. The torque output of mover 50 may equal the sum of the torque required to input into prime mover 20 and/or transmission 30 (also accounting for possible losses in efficiency due to gears) along with the cumulative torque of accessories driven by prime mover 50.

Interface 41 can be a starter ring gear also known as a starter ring or ring gear. Prime mover 50 can be utilized as the starter motor to transfer power to the flywheel. The starter ring or ring gear can be attached to the periphery of a flex plate or flywheel of prime mover 20. The ring gear may utilize a different gear design and/or harder material to allow second prime mover 50 to provide more power or operate for much longer durations than a conventional starter motor.

In some embodiments, a second transmission fluid pump may be provided on the second prime mover 50 and may be activated to increase the flow of transmission fluid through component 40 and the second prime mover 50. The power to circulate transmission fluid to second prime mover 50 and operate the cooling system while the chassis is not being driven may be provided by an internal electric pump. According to an exemplary embodiment, component 40 could have an integrated pump. In such an embodiment, the transmission fluid pump is actuated by movement of second prime mover 50. The transmission fluid pump is moved by component 40 if second prime mover 50 is rotated by component 40. A second transmission fluid pump may be provided on second prime mover 50 and may be activated to increase the flow of transmission fluid through component 40 and second prime mover 50. Such increased flow may be advantageous.

Figure 4:
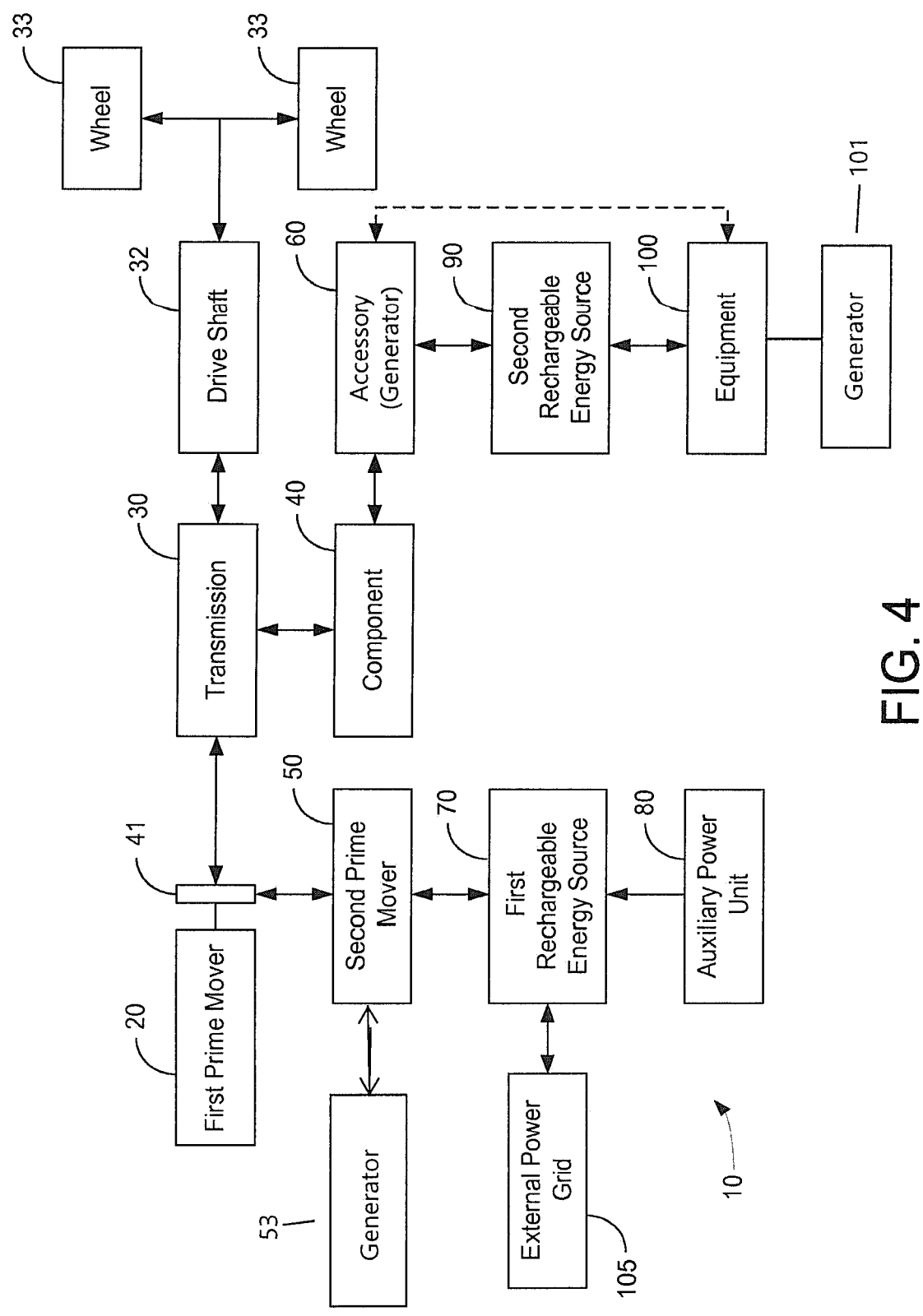
FIG. 4 is a general block diagram of a hybrid vehicle drive system according to still another exemplary embodiment.

With reference to FIG. 4, system 10 includes second prime mover 50 coupled to interface 41. However, accessory 60 is coupled to component 40 and driven through transmission 30 component 40 embodied as a PTO. Accessory 60 can be driven from prime mover via interface 41 or from prime mover 20. Alternatively, mover 50 can be coupled to component 40 with accessory 60. In some embodiments, second prime mover 50 drives a generator 53 using power form interface 41 or energy source 70. Generator 53 is similar to generators 1006 or 1016 (FIG. 1) in some embodiments.

Accessory 60 and prime mover 20 can be coupled through component 40 as a rear mounted PTO in some embodiments. The rear mounted PTO can be used as the input/output for energy from the various hybrid system combinations that are shown to work with the PTO on the transmission 30 in this application or any of the applications incorporated herein by reference. The rear mounted PTO embodiment is less dependent on transmission 30 and can potentially be used with a wide variety of transmissions. It is also not necessary to operate transmission 30 to operate component 40 (e.g., rear mounted PTO), so it should be more efficient (potentially less moving parts). If mover 50 is used as starter in this embodiment, an offset gear and shaft may be needed for packaging purposes. Also, a gear reducer may also be used in this embodiment if mover 50 is used a starter.

Optional APU 80 can be used to power first rechargeable energy source 70 when the vehicle is driving up a grade, as well as other situations. This use is intended to improve vehicle performance, particularly when the power requirements of the vehicle exceed the power available from first prime mover 20, first rechargeable energy source 70, and second rechargeable energy source 90. The presence of APU 80 is intended to allow for a smaller first prime mover 20. In one embodiment, APU 80 is of a type that produces lower emissions than first prime mover 20. APU 80 is intended to enable a vehicle using system 10 to meet various anti-idle and emission regulations.

In one embodiment, system 10 is configured to automatically engage APU 80 or first prime mover 20 through component 40 or accessory 60 to charge first rechargeable energy source 70 when the stored energy decreases to a certain amount. The permissible reduction in stored energy can be determined based upon a user selectable switch. The switch specifies the method of recharging first rechargeable energy source 70 from an external power grid.

In one embodiment, a user can select between 220-240V recharging, 110-120V recharging, and no external power source available for recharging. For the different voltages, the amount of power that can be replenished over a certain period of time (e.g., when connected to an external power grid overnight) would be calculated. Beyond that amount of power usage, first prime mover 20, or APU 80 is engaged to charge or provide power to first rechargeable energy source 70. If no external power source is available, first prime mover 20 or APU 80 can be automatically engaged during regular finite periods, calculated to minimize idle time. In one embodiment, APU 80 and/or optionally first rechargeable energy source 70 can provide power to an external power grid 200, also known as vehicle to grid (V2G) power sharing. This is intended to provide low-emission power generation and/or reduce requirements to generate additional grid power during peak loads on the grid.

In another embodiment, a user may only select between two settings, one setting to select charging using a grid and the other setting to select charging without using an external power grid. The controller would monitor state of charge of the batteries and control recharging differently for each setting. If no external charging from a power grid is selected, system 10 may allow the state of charge of first rechargeable energy source 70 (batteries) to drop to a threshold (as an example 30%), then the controller would cause either first prime mover 20 or the optional APU 80 to be engaged to charge batteries to a predetermined level (as an example 80%) to minimize the frequency that first prime mover 20 or APU 80 must be started. Or different levels of discharge and recharging may be selected to minimized idle time. System 10 can occasionally recharge batteries to 100% of charge to help condition the batteries. Optionally, system 10 can be operated so that batteries remain between a narrow range of state of charge in order to extend the life of the batteries, such as between 80% SOC and 50% SOC for example. If the user selectable switch indicated system 10 would be charged from an external power grid, the controller may allow the state of charge of first renewable energy source to drop to a threshold (as an example 30%), then the controller would cause either first prime mover 20 or optional APU 80 to be engaged to charge batteries to a predetermined level that is lower (as an example 50%). The lower level allows the external power grid to recharge a greater amount of first rechargeable energy source 70 when vehicle can be plugged in or charged by the external power grid, reducing the fuel consumption of prime mover 70 or optional APU 80. In another embodiment, a control system and/or algorithm is used to detect the likely use or absence of external grid power for recharging batteries. A variety of means can be used to predict with a higher degree of confidence whether the vehicle will be charged using external grid power. Previous history in the use of external charging may be considered, and/or the location of the vehicle, possibly during certain times, may be used with possible other inputs to predict whether the vehicle is likely to be recharged using external grid power. The operation of the hybrid system can then be optimized as described to maximize efficiency or other beneficial operational characteristics, such as maximum time with engine off while vehicle is working in a stationary position.

External power grid 200 allows first rechargeable energy source 70 to be recharged with a cleaner, lower cost power compared to recharging first rechargeable energy source 70 with first prime mover 20. Power from an external power grid may be provided at a fraction of the cost of power provided from an internal combustion engine using diesel fuel. According to one exemplary embodiment, first rechargeable energy source 70 can be recharged from an external power grid 200 in approximately 8 hours or less.

In some embodiments, second rechargeable energy source 90 is utilized, and provides power to accessory 60. Additional or alternative power can be provided to drive shaft 32 by accessory 60. For example, accessory 60 can provide power to drive shaft 32 until second rechargeable energy source 90 is discharged. Alternatively, accessory 60 can provide additional power to drive shaft 32 during vehicle acceleration. Accessory 60 provides power to drive shaft 32 through second prime mover 50, interface 41, and transmission 30. The combination of power provided to drive shaft 32 by second prime mover 50 and accessory 60 is intended to allow for the use of a smaller first prime mover 20 which provides the best use of stored energy and reduces the overall system mass. In another embodiment, accessory 60 only receives power from second prime mover 50 or from first prime mover 20 through component and does not provide power to drive shaft 32. Accessory 60 may power equipment directly.

In one exemplary embodiment, an optional clutch such as clutch 22 or clutch 42 can be coupled between first prime mover 50 and accessory 60. The clutch is disengaged when the vehicle is stationary so second prime mover 50 can turn accessory 60 without unnecessarily driving component 40.

A variety of control systems can be utilized to control the various components (clutches, motors, transmissions, etc.) in system 10. Electronic control systems, mechanical control systems, and hydraulic control systems can be utilized. In addition, a controller can be provided to indicate a request to operate an accessory or other equipment. In one embodiment, a controller similar to the controller in U.S. Pat. No. 7,104,920 incorporated herein by reference can be utilized. Preferably, the controller is modified to communicate by pneumatics (e.g., air), a wireless channel, or fiber optics (e.g., light) for boom applications and other applications where conductivity of the appliance is an issue.

The control system can utilize various input criteria to determine and direct the amount of power required or to be stored, the input criteria can input operator brake and acceleration pedals, accessory requirements, storage capacity, torque requirements, hydraulic pressure, vehicle speed, etc.

A control system can control the torque and power output of second prime mover 50 and accessory 60 so that component 40, second prime mover 50 and accessory 60 are operated within the allowable torque and power limitations of each item so that the sum of second prime mover 50 and accessory 60 do not exceed component 40 or exceed capacity of transmission 30, such as capacity of transmission power takeoff drive gear rating or exceed capacity of transmission maximum turbine torque on an automatic transmission. In some embodiments, control system controls the torque and power output of second prime mover 50 and accessory 60 so that component 40, second prime mover 50 and accessory 60 are operated within the allowable torque and power limitations of each item so that the sum of second prime mover 50 and accessory 60 do not exceed capacity of generators 53, 63, or 101 or accessory 60. Optionally the controller may monitor and control additional input torque from the prime mover, or input torque of the prime mover after multiplication by the torque converter, along with that from other prime movers or accessories to ensure that the turbine torque limit is not exceeded or other internal torque ratings of components within an automatic transmission or an auto shift manual transmission, or a manual transmission. The torque and power output of second prime mover 50 and accessory 60 may also be controlled using an input from the driver and/or from a power train control system. If two components are used as described in other embodiments in U.S. application Ser. No. 12/710,247, the torque and power output of the second and third prime mover and optional accessory or accessories may be controlled so that the transmission power takeoff drive gear rating with two power takeoffs is not exceeded or that the capacity of transmission maximum turbine torque on an automatic transmission, or other toque rating of an internal component within a transmission of the same or different kind, such as, an auto shift manual or manual transmission, is not exceeded.

In some embodiments where vehicle 10 is provided with a large or high power generators (e.g., as generators 53, 63, or 101 or accessory 60 or vehicle 100) is provided with a large or high power generators (e.g., as generators 1006 or 1016, generator), a controller is configured to monitor one or more of the following: the torque output of the first prime mover (engine), torque output of the second prime mover, and power from the generator(s) to insure that the none of the components in the system are overloaded. As an example, during recharging of the battery and simultaneous generation of export power, the second prime mover torque may be varied to ensure that the sum of the two torques does not overload the rated torque of the component 40, 1004, or 1014 (e.g., the PTO). During a power boost mode, in which the first prime mover 20 (or engine 1002) provides power to the generator (e.g., generators 53, 63, 101, 1006, or 1016 or accessory 60), and the second prime mover draws energy from the battery to provide additional power for the generator (e.g. generators 53, 63, 101, 1006, or 1016 or accessory 60), the torque of both the first prime mover 20 (or engine 1002) and the second prime mover 50 or 1032 may be monitored and controlled so that the interface between the second prime mover 20 (or engine 1002) and the generator is not overloaded, or that the generator does not become overloaded, or that the generator does not overheat.

In some embodiments, an optional clutch between the second prime mover 20 or 1032 and the generator (e.g., generators 53, 63, 101, 1006, or 1016) or accessory 60 has a torque rating. The torque rating should be greater than the torque applied to the clutch by the first prime mover 20 or engine 1002 alone (mode 2), the second prime mover 120 or 1032 alone (mode 1), or the first and second prime mover working together (mode 3) to provide torque. Each of the modes is separate and does not have to be included in the operation of the vehicle 10 or 1000.

According to other exemplary embodiments, a control system can be used for other purposes (e.g., coupling component 40 to transmission 30; monitoring the charge status of first rechargeable energy source 70 and second rechargeable energy source 90; monitoring and managing the thermal status of various components (e.g., generators, prime movers, rechargeable energy sources, electronics, etc.); operating first prime mover 20, second prime mover 50, and accessory 60 to replenish energy in first rechargeable energy source 70 and second rechargeable energy source 90 and/or supply power to equipment 100; operate APU 80 as needed; or control other functions). Information on the status of the system, such as operating efficiency, status of rechargeable energy sources, and certain operator controls may be displayed or accessed by the driver.

APU 80 charges or provides power to first rechargeable energy source 70 when necessary. APU 80 can include a generator powered by an internal combustion engine. The generator can be connected to first rechargeable energy source 70 through a power converter, AC/DC power inverter or other charging system. First rechargeable energy source 70 provides power to second prime mover 50. The operation of second prime mover 50 operates accessory 60. Accessory 60 provides power to on-board or external equipment 100. First rechargeable energy source 70 and/or APU 80 may provide all the power for system 10 when the vehicle is stationary and first prime mover 20 is turned off (e.g., in an idle reduction system). If second prime mover 50 is not coupled to drive shaft 32 and instead provides power to accessory 60 (e.g., in an idle reduction system), system 10 may include a simplified control and power management system.

According to another exemplary embodiment, first prime mover 20 may be operated periodically to provide power to second prime mover 50 through interface 41. Second prime mover 50 recharges first rechargeable energy source 70 and/or powers accessory 60. Accessory 60 can recharge second rechargeable energy source 90 or operate other equipment.

According to another exemplary embodiment, system 10 is configured as an idle reduction system that can provide power to vehicle loads such as HVAC, computers, entertainment systems, and equipment without the need to idle the engine continuously. Accordingly, system 10 uses an electric motor (e.g., prime mover 50) to power a hydraulic pump (e.g., accessory 60) for the operation of hydraulic equipment (e.g., aerial buckets, hydraulically powered compressors, etc.). Alternatively, the electric motor may directly power a compressor. The electric motor can be configured to only operate when there is a demand for hydraulic flow or the need to operate other mechanically coupled equipment to conserve energy within first rechargeable energy source 70. The electric motor can be activated by a controller that receives a signal sent through fiber optics or a signal sent through other means.

Batteries (e.g., rechargeable energy source 70) provide energy for the electric motor. After the batteries are depleted, an external power grid is used to recharge the batteries.

If the rechargeable energy reserve is large enough, the electric motor (mover 50) may operate continuously, eliminating the need for a controller to turn motor on and off based upon demand. Such a system may be coupled to a variable volume displacement pump to reduce flow when demand for hydraulic flow is low, resulting in lower consumption of power from the rechargeable energy source. This same method of continuous operation can also be used for hybrid system configurations.

Depending upon the battery system, the batteries may be thermally corrected during charging. Thermal correction may be needed if the temperature of the battery exceeds a certain threshold. A cooling system, either external to the vehicle or internal to vehicle may be used, such that coolant is circulated to reduce heat or the battery case can be ventilated with cooler air to dissipate heat, possibly with a powered ventilation system. A second pump may also be connected to a PTO. First prime mover 20 may be started and used to recharge by engaging component 40 to transmission and operating second prime mover 50 as a generator to recharge first rechargeable energy source batteries. If there is insufficient energy to operate the electric motor driven hydraulic pump, the vehicle engine is started, PTO engaged and the second pump is used to power the equipment. Further, the second pump can be used when the hydraulic power requirements exceed the power output of the electric motor coupled to the hydraulic pump. Alternatively, prime mover 50 could directly power the first accessory (hydraulic pump) and the second prime mover could be made not to operate as a generator. Not operating second prime mover as a generator may reduce system complexity and reduce cost.

In another embodiment, first rechargeable energy source 70 provides power to electrical systems of the vehicle such as "hotel loads" (e.g., HVAC, lighting, radio, various electronics, etc.). In yet another embodiment, first rechargeable energy source 70 charges a main crank battery of the vehicle. The main crank battery can be isolated from system 10. First rechargeable energy source 70 may also be used in other configurations that use 100% electric propulsion for certain periods to power additional vehicle systems such as power steering, brakes and other systems normally powered by first prime mover 20.

In yet another embodiment, second prime mover 50 provides power to external devices directly or through an additional rechargeable energy source and an associated inverter. Utilizing second prime mover 50 to power external devices is intended to lessen the need for an additional first prime mover 20 powered generator.

In yet another embodiment, a sophisticated control system (e.g., a pump control system utilizing fiber optics, etc.) can be used to control the operation of accessory 60. In yet another embodiment, accessory 60 is a variable volume displacement pump. Accessory 60 can operate continuously, only providing flow if there is a demand. When no demand is present, accessory 60 provides little or no additional friction or resistance within the system.

In one alternative embodiment, system 10 can be configured to only store energy (from regenerative braking and/or from engine) in source 70 and not provide launch assist. Such a system would simplify interaction with the power train and still save fuel by using stored energy to charge the lower voltage vehicle bus (i.e. 12 V, 24 V or 48 V) without having to rely significantly on the Front-end Accessory Drive system (FEAD) integrated generator (alternator). The FEAD generator (which is typically mounted on the front of the engine or mover 20 and coupled to the crankshaft via belts) consumes prime mover power. In this alternative embodiment, energy form source 70 can also be used at the jobsite.

Referring to FIG. 2A, first rechargeable energy source 70 and/or APU 80 may provide power for system 10 when the vehicle is stationary and first prime mover 20 is turned off (e.g., in an idle reduction system). For example, energy source 70 may power accessory 60. In one embodiment, second rechargeable energy source 90 is utilized. Accessory 60 stores energy in second rechargeable energy source 90, as shown. Second prime mover 50 is engaged to operate accessory 60 (e.g., a hydraulic pump) when the stored energy in second rechargeable energy source 90 (e.g., a hydraulic accumulator) is reduced to a predetermined level. The utilization of second rechargeable energy source 90 is intended to reduce operation time of accessory 60. Accessory 60 only needs to operate to maintain energy in second rechargeable energy source 90. On-board or external equipment 100 (e.g., any hydraulic equipment) is powered by second rechargeable energy source 90. In one embodiment, a clutch mechanism is used to disengage accessory 60 from second prime mover 50 during vehicle travel when second rechargeable energy source 90 has been fully charged. This is intended to reduce friction on system 10 when second prime mover 50 is needed, but accessory 60 is not. Second rechargeable energy source 90 can provide hydraulic power to equipment 100 at a constant system pressure through a pressure reducing valve.

Alternatively, second rechargeable energy source 90 and two hydraulic motor/pump units are coupled together to provide constant system pressure and flow. The first unit (e.g., a hydraulic motor) receives high pressure flow from second rechargeable energy source 90. The first unit is coupled to a second unit (e.g., a pump) which supplies hydraulic power to equipment 100 at a lower pressure. Both hydraulic second rechargeable hydraulic circuit and low pressure hydraulic equipment circuit have a high pressure and a low pressure (reservoir or tank) sections. A control system may be utilized to maintain constant flow in the low pressure hydraulic equipment circuit as the high pressure flow from the second rechargeable source (accumulator) reduces or varies. The advantage of this configuration is that the energy from the high pressure accumulator is more efficiently transferred to the equipment. This configuration also allows independent hydraulic circuits to be used for the propulsion system and for equipment 100. The independent hydraulic circuits allow for fluids with different characteristics to be used in each circuit. Further, a hydraulic circuit that may be susceptible to contamination (e.g., the equipment circuit) can be kept separate from the other hydraulic circuit (e.g., the propulsion circuit).

In another embodiment, second rechargeable energy source 90 is utilized, and accessory 60 is a hydraulic pump. Second rechargeable energy source 90 can include a low pressure fluid reservoir and a hydraulic accumulator. The utilization of second rechargeable energy source 90 obviates the need for a sophisticated pump control system and the associated fiber optics; instead a simpler hydraulic system can be used (e.g., an insulated aerial device with a closed center hydraulic system and a conventional control system, etc.). If the speed of accessory 60 slows due to depletion of on-board power sources, accessory 60 can operate longer to maintain energy in second rechargeable energy source 90. This is intended to minimize any negative effects on the operation of equipment 100. According to one exemplary embodiment, second prime mover 50 is an AC motor and turns at generally a constant rate regardless of the output volume of accessory 60 (e.g., to create two or more different levels of flow from accessory 60).

However, in some scenarios, second prime mover 50 may provide power to accessory 60 and the speed of second prime mover 50 may be varied by a controller. For example, the speed of second prime mover 50 may be varied to reduce the flow of fluid from accessory 60 (e.g., for two speed operation of an aerial device where lower hydraulic flow may be desirable for fine movement of the boom).

In one embodiment, system 10 can provide the advantage of allowing a vehicle to operate at a work site with fewer emissions and engine noise by using an operating mode. In an operating mode, first prime mover 20 (e.g., an internal combustion engine, such as a diesel fueled engine, etc.) is turned off and interface 41 is disengaged via clutch 42 from transmission 30, power from first renewable energy source 70 and second renewable energy source 90 are used to operate on-board or external equipment 100 and electrical systems of the vehicle such as "hotel loads" (e.g., HVAC, lighting, radio, various electronics, etc.). According to another exemplary embodiment, second renewable energy source 90 may be optional and first renewable energy source 70 may directly power to equipment 100. According to one exemplary embodiment, first renewable energy source 70 has a capacity of approximately 35 kWh and is configured to provide enough power to operate the vehicle for a full day or normal operation (e.g., 8 hours).

Referring to FIG. 2A when APU 80 is out of fuel, APU 80 is not used, or APU 80 is not present, first rechargeable energy source 70 can be recharged by other components of system 10 (in addition to other methods). First prime mover 20 and second prime mover 50 are preferably operated and synchronized to the same speed (e.g., input and output mechanical communication through component 40 is a one-to-one ratio). First prime mover 20 provides power to second prime mover 50 through interface 41. Adjustments to second prime mover 50 speed is made if the ratio between first prime mover 20 and second prime mover 50 is not one to one to minimize wear of clutches associated with interface 41 or to speed of first prime mover 50. Operation of second prime mover 50 recharges first rechargeable energy source 70 to a predetermined level of stored energy. This method of recharging first rechargeable energy source 70 is intended to allow continuous system operation in the field without the use of external grid power. This method is further intended to allow continuous operation of equipment 100 during recharging of first rechargeable energy source 70.

While charging first rechargeable energy source 70, second prime mover 50 can simultaneously operate accessory 60. Accessory 60 provides power to on-board or external equipment 100. After first rechargeable energy source 70 has been recharged, component 40 is disengaged from transmission 30. Operation of accessory 60 can continue without the use of first prime mover 20. Alternatively, with interface 41 engaged, operation of accessory 60 can continue powered in part or in full by prime mover 20. This may be useful for example, if there is a failure in one of the other components that power accessory 60. This may also be useful if the power demand from accessory 60 exceeds the power available from second prime mover 50. According to one exemplary embodiment, first prime mover 20 provides supplementary power to or all of the power to equipment 100 (e.g. a digger derrick that may require higher hydraulic flow during digging operations). Using first prime mover 20 to provide supplementary power to equipment 100 during intermittent periods of high power requirement allows system 10 to include a smaller second prime mover 50 that is able to provide enough power for the majority of the equipment operation. The control system may receive a signal from the equipment indicating additional power is required beyond that provided by second prime mover 50. Such a signal may be triggered by the operator, by activation of a function (e.g., an auger release, etc.), by demand in the circuit or component above a predetermined threshold, or by other means.

Referring to FIG. 2A, second rechargeable energy source 90 is utilized. Accessory 60 provides power to second rechargeable energy source 90. In one embodiment, on-board or external equipment 100 (e.g., hydraulic cylinders, valves, booms, etc.) is coupled to second rechargeable energy source 90, and can be powered by second rechargeable energy source 90. External equipment 100 may also be operated directly by accessory 60 without the use of a second rechargeable energy source 90. This method of recharging first rechargeable energy source 70 and second rechargeable energy source 90 is intended to allow continuous system operation in the field without the use of external grid power. This method is further intended to allow continuous operation of equipment 100 during recharging of first rechargeable energy source 70 and second rechargeable energy source 90.

Referring to FIG. 3, in one embodiment, clutch 22 or other mechanism is used to disengage first prime mover 20 from transmission 30 during vehicle braking. This is intended to maximize the regenerative energy available from vehicle braking. The forward momentum of the vehicle provides power from wheels 33 to transmission 30. Transmission 30 may be reduced to a lower gear to increase the RPMS and increase the amount of energy transferred to second prime mover 50. Second prime mover 50 can operate to charge first rechargeable energy source 70 and help slow the vehicle according to principles of regenerative braking. Regenerative braking could replace a Jake brake or compression release brake, which does not recapture energy when braking in one embodiment.

Disengaging first prime mover 20 from transmission 30 further reduces the amount of energy transferred back to first prime mover 20 during braking and reduces the need for engine braking. The control system for the hybrid components may also monitor chassis anti-lock brake system (ABS) activity. If the chassis anti-lock brake system has sensed possible wheel lock-up and has become active, possibly due to low traction or slippery road conditions, then hybrid regenerative braking is suspended by the hybrid control system. The regenerative braking system may be disabled as soon as ABS is active and may remain off for only as long as the ABS is active, or alternatively regenerative braking may remain off for a period of time after ABS is no longer active or regenerative braking may remain off for the remainder of the ignition cycle to eliminate the chance that regenerative braking could adversely affect vehicle handling in low friction, slippery road conditions during the current ignition cycle. At the next ignition cycle, regenerative braking may be reactivated.

Referring to FIG. 2A, second rechargeable energy source 90 is utilized. As mentioned above, during vehicle braking, first rechargeable energy source 70 is charged through operation of second prime mover 50. Accessory 60 can operate to further slow the vehicle, and store energy in second rechargeable energy source 90, if second rechargeable energy source 90 is not fully charged. In this manner, regenerative braking can be used to simultaneously charge multiple energy storage devices of system 10. This is intended to allow recharging of both energy storage devices through braking during vehicle travel, among other advantages. A clutch (e.g., clutch 22) can be optionally included between first prime mover 20 and transmission 30 to further improve regenerative braking.

In one embodiment, during operation of equipment 100, component 40 is not coupled to second prime mover 50 and accessory 60 can optionally directly power equipment 100. An optional APU 80 can charge first rechargeable energy source 70 and/or second rechargeable energy source 90 as required.

According to another exemplary embodiment, system 10 may be an idle reduction system. An idle reduction system may have a configuration similar to any previously described embodiment of system 10 but is not configured to provide power back to first prime mover 20 and drive shaft 32 (e.g., the drive train). Instead, interface 41 only provides power in one direction (e.g., interface 41 does not back-drive into transmission 30). Such a system 10 does not require additional software, calibration and control electronics that is required for the integration of a hybrid drive system. Such a system 10 may also not require sophisticated thermal management systems and higher capacity motors and drive electronics. Such a system 10 may include an optional secondary rechargeable power source 90 such as an accumulator and/or an optional APU 80 or may even include a connection to a power grid. If system 10 does not include a second rechargeable power source 90 such as an accumulator, system 10 may include air, wireless or fiber optic controls. If system 10 includes a second rechargeable power source 90, no additional control system is required (e.g., the accumulator forms a closed centered hydraulic system with hydraulic controls).

As an example, in one idle reduction configuration with reference to FIG. 4, component 40 is a PTO with an integrated clutch component and is connected to a transmission 30 and is coupled to a hydraulic motor (e.g., accessory 60). When the batteries reach a low state of charge, or the electric motor speed slows below an acceptable level due to low battery energy, the prime mover (usually a diesel or gas engine) is started. The engine rpm is adjusted so that the PTO shaft will provide the needed rotational speed for the hydraulic pump. PTO is then engaged and drives the hydraulic pump.

The batteries can be charged through the electric motor, or through a vehicle alternator, or alternatively the batteries may remain depleted at the job-site and recharged once the vehicle returns to a location in which power from the grid can be used to recharge the batteries. If batteries remain depleted, the engine is started, PTO is engaged and hydraulic pump or other auxiliary equipment often used on a work truck at a job-site is mechanically powered by the first prime mover (ICE) or mover 20 through interface 41.

The location to charge the vehicle may be a garage with a charging station or an ordinary plug. Using only grid power to recharge the batteries can simplify the idle reduction system. A separate vehicle monitoring system may record if the batteries are recharged at a garage overnight, or if the batteries need to be serviced or replaced. Such a system may send a signal via a link (such as cellular, satellite, or wireless local area network, or a wired connection) to a fleet management system so that fleet personnel can take action to maintain system or train vehicle operators.

The battery system may be designed to be modular and easy for replacement battery modules to be installed. A modular, replaceable battery system can allow a vehicle to use a lower cost battery initially that has a shorter useful life and then replace it when the existing battery no longer can store sufficient energy, with the same type of battery, or a more advanced battery. A replaceable battery system may be beneficial since lower cost batteries can be used until more advanced batteries capable of more energy storage, lower mass and greater service life are available at lower costs. The battery system may have electronics integrated in a module and may include thermal management. The electronics may produce uniform input and output electrical characteristics, allowing for different battery technologies to be used, without affecting idle reduction performance. The battery may also be designed for quick replacement. Such a design could make it possible to use batteries that are charged at a base station. Batteries at a base station may provide power for a facility or to the grid when not needed for a vehicle. There may be additional electronics integrated with the battery module including monitoring circuitry to record power available, power used, how much of the battery life has been reduced (possibly based upon overall percent discharge, rate of discharge and recharge, average operating temperature, frequency of balancing various cells or frequency of achieving full state of charge). Such a system may allow for rental of a battery system or payment based upon battery usage and estimated reduction in battery useful life. This type of modular battery system can also be used on other embodiments of hybrid systems described in this disclosure.

As has been discussed, system 10 may perform many different functions. The function of the various exemplary embodiments of system 10 may change based on the behavior of the vehicle that includes system 10. For example, when the vehicle is braking, regenerative braking may be used to recharge first rechargeable energy source 70 and/or second rechargeable energy source 90. During acceleration, first rechargeable energy source 70 and/or second rechargeable energy source 90 may be used to provide power to the drive train. When the vehicle is parked, on-board equipment 100 such as a hydraulic lift may be activated. Such a hydraulic lift would draw power from second rechargeable energy source 90 (e.g., a hydraulic accumulator) or be driven directly by an accessory 60 such as a hydraulic pump. Once the lift is raised and stops, hydraulic fluid no longer flows. In this position, second rechargeable energy source 90 does not have to be charged and accessory 60 does not have to run to keep the hydraulic lift raised. Therefore, when the lift is not moving, second prime mover 50 may be turned off to reduce unnecessary consumption of energy from first rechargeable energy source 70 and first prime mover 20 may be turned off to reduce unnecessary idling. Prime mover 20 may remain off when the vehicle is parked if there is sufficient energy in rechargeable energy sources for equipment, or "hotel loads", or power that is exported from the vehicle to power tools or lights or other loads. System 10 may include sensors and a control system to automatically turn on and off first prime mover 20, second prime mover 50, accessory 60, or other components of system 10 when they are not needed thereby conserving fuel and reducing emissions.

According to various exemplary embodiments, the elements of system 10 may be coupled together with fluid couplings.

Figure 5:
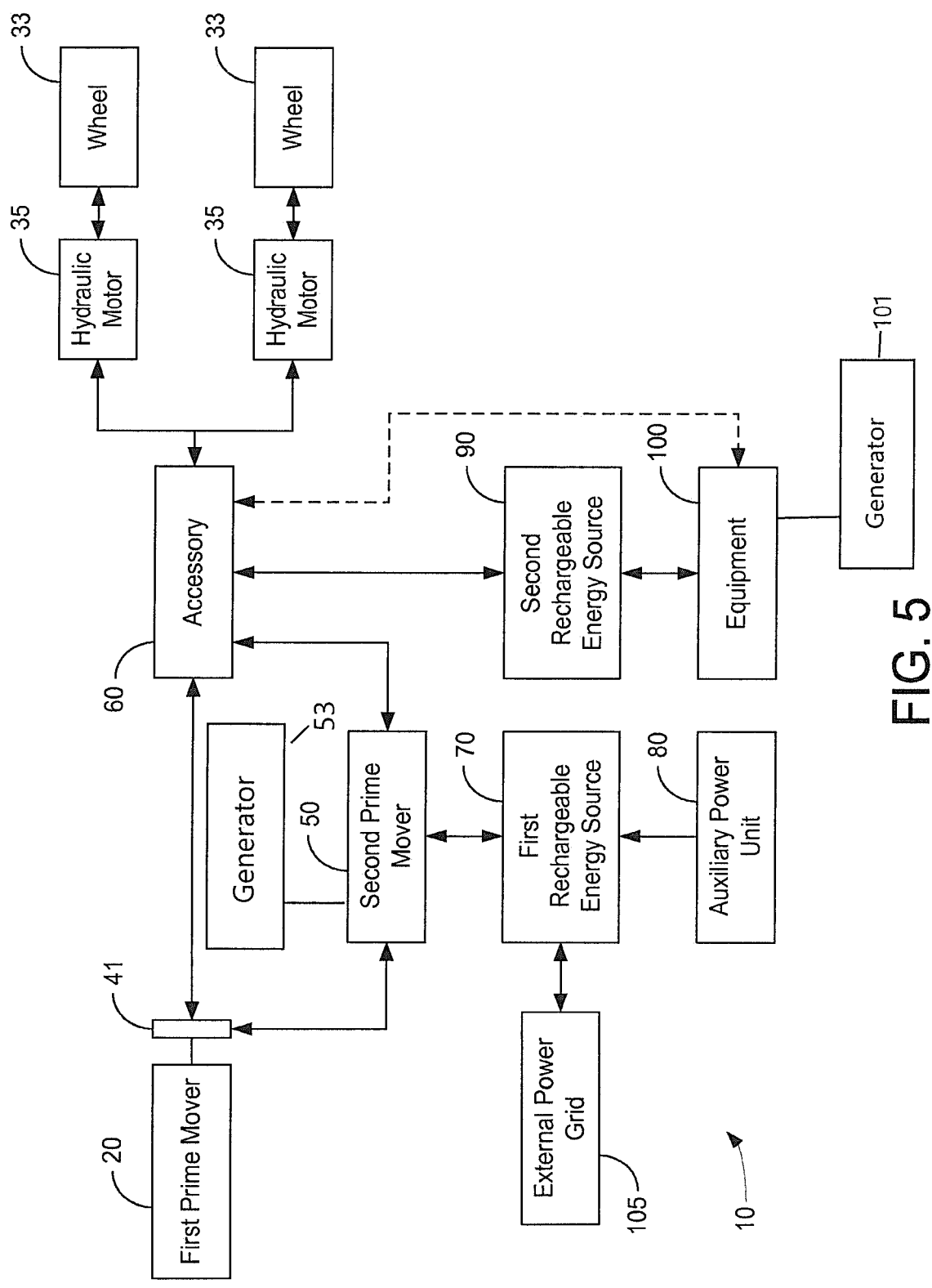
FIG. 5 is a general block diagram of a hybrid vehicle drive system according to yet another exemplary embodiment.

With reference to FIG. 5, vehicle 10 is preferably a construction vehicle such as a construction vehicle including tracks or wheels 33. A separate hydraulic motor 35 can be provided for each wheel 33 or track. Hydraulic motors 35 are powered via accessory 60 embodied as a pump. Optional clutch 52 (FIG. 3) between mover 50 and accessory 60 allows disconnect of electric motor. Clutch 52 (FIG. 3) between prime mover 50 and accessory 60 allows all electric operation. In addition, motors 35 can receive power via second rechargeable energy source 90. Prime mover 20 can power accessory 60 and motors 35 via second prime mover 50. Alternatively, prime mover 50 can operate in an all-electric or hydraulic mode thereby reducing idle times. Idle reduction in construction equipment is particularly advantageous because the vehicle often has to refueled in the field. Accordingly, fuel saving is particularly advantageous. The vehicle associated with system 10 in FIG. 5 can utilize the idle reduction capabilities discussed above with reference to FIGS. 1-4. In addition, motor 50 can be configured to drive electric loads associated with the vehicle embodied as construction equipment. Mover 20 can optionally be coupled to drive accessory 60. A PTO based interface as disclosed in the U.S. patent application Ser. No. 12/130,888 can be utilized as opposed to interface 41.

With reference to FIG. 6, system 10 can be utilized with the vehicle and control systems described in PCT Application No. PCT/US2012/029835. Using the data derived from routes traveled by the vehicle, the structure of vehicle or system 10 can be adjusted for particular routes. For example, motors can be added or removed and batteries can be added or removed to optimize efficiency. For example, the modular battery system associated with first rechargeable energy source 70 can be adjusted based upon historical data on usage to achieve best storage capacity for particular routes, applications, or particular types of jobs. For example, battery modules can be added or subtracted or coupled in series or parallel in response to data. In another embodiment, prime movers (hydraulic or electric) can be added or removed based upon this data. In another embodiment, hybrid system 10 itself can be configured as a series or parallel hybrid system based upon the data. System 10 in FIG. 6 can be a PTO based system as described in U.S. patent application Ser. No. 12/710,247 or PCT Application No. PCT/2012/029835. Monitoring of existing vehicles in the fleet can be used to help determine the optimum energy storage size, especially if the system used one or more modular batteries. The monitoring of existing vehicles allows for the use of model to predict improvements in efficiencies for various hybrid configurations and energy storage sizes. The monitored vehicles would be used as a baseline, and the vehicles with the hybrid systems would be estimated to follow a similar duty cycle once used in the fleet.

FIG. 8 shows a hybrid system 10 capable of operating in modes discussed herein including but not limited to idle bumping and fuel reductions modes. System 10 includes mover 50 and an optional clutch disposed between transmission 30 and prime mover 20. System 10 in FIG. 8 can operate in an all-electric mode based upon operator to input to control system 49. Alternatively, system 10 can automatically operate in the all-electric mode based upon location using a GPS device. For example, when in city limits, system 10 can be automatically placed in an all-electric mode.

Use of second prime mover 50 to reduce or eliminate power required by first prime mover 20 may be enabled without any external input or operator input. Optionally, control system 49 may receive input from external sources or operator input to enable the use of second prime mover 50 to reduce or eliminate fuel consumption from first prime mover 20. Such input may be from a switch activated by the operator to signal that the vehicle should be operated in a mode only using energy from rechargeable energy source 70. Other inputs such as a signal from a fleet management system or other remotely transmitted signal may cause vehicle to operate without consuming fuel. Such a means of operation maybe especially advantageous if the signal is sent in response to declining air quality. System 10 may also monitor the location of the vehicle and activate the mode of reduced or eliminated fuel use if the vehicle is within a certain geographic area, such as the boundary of a city or area determined by a "geo-fence" or virtual perimeter. Time of day may also be factored into the determination of whether to enter into the mode of operation that primarily uses power from second prime mover for propulsion of vehicle. Time of day may be especially advantageous if the mode of operation results in lower noise levels in comparison to vehicle operation using more power from first prime mover. City ordinances or other restrictions may prohibit operation of vehicles if first prime mover is used and produces noise in excess of allowable limits.

A hybrid powertrain configuration shown in FIG. 8 with an accessory mounted to a PTO on transmission 30 (with or without accessory 60 and its associated components shown in FIG. 8) can also be used to operate in a mode in which energy required by first prime mover 20 can be reduced or eliminated while still providing power to accessories that receive power from first prime mover 20. Accessories receiving power from first prime mover 20 may be power steering, HVAC, braking or other components and vehicle sub-systems. The operating mode may be achieved by connecting clutch 47 between second prime mover 50 and first prime mover 20 to effectively couple second prime mover 50 to first prime mover 20. Optional clutch 47 may not be used in other embodiments. Second prime mover 50 is operated preferably using energy from rechargeable energy source 70. Rechargeable energy source 70, as in other configurations of system 10, maybe operated in charge depleting mode or a charge sustaining mode if it stores electrical energy. The charge depleting mode may be especially advantageous if rechargeable energy source 70 is recharged by grid 200. The charge sustain mode may be more advantageous if rechargeable energy source 70 is not recharged by the grid 200. Second prime mover 50 rotates or supplies torque to first prime mover 20 so that first prime mover fuel consumption is reduced as explained above. Second prime mover 50 can also move the vehicle without first prime mover 20 consuming fuel by transmitting torque to both the first prime mover 20 and transmission 30. A first prime mover control system may react to the torque provided by second prime mover 50 by limiting or eliminating fuel use of first prime mover. The first prime mover control system may also react to a signal or detect operating mode so that first prime mover fuel use is limited or eliminated without having to rely upon second prime mover torque or motion (rpm) being applied to first prime mover 20 to provide conditions in which the first prime mover control system causes a reduction or elimination of fuel.

An optional clutch 47 or auto-clutch mounted between first prime mover 20 and second prime mover 50 can be provided in one embodiment. Transmission 30 may have a clutch, or a torque converter or a combination of both in one embodiment. Transmission 30 can also include a PTO coupled to an accessory in one embodiment. Second prime mover 50 may be mounted so that its axis of rotation is approximately on the same axis of rotation as that of the crankshaft or output of first prime mover 20. In such a configuration, it may be necessary to open or disconnect clutch 47 between first prime mover 20 and second prime mover 50 to allow second prime mover 50 to rotate transmission 30 without causing motion of first prime mover 20 and provide power through transmission 30 to a transmission mounted PTO, which may provide power to an accessory. Clutch 47 between first prime mover 20 and second prime mover 50 in FIG. 8 may be required to be larger and relatively more expensive to transmit the maximum torque of first prime mover 20 when compared to the configuration of system 10 described with reference to FIG. 2B. Clutch 47 and second prime mover 50 may also be subject to more vibration due to coaxial alignment with first prime mover 20 than clutch 42 and second prime mover 50 shown in the configuration of system 10 in FIG. 2B or other configurations in which second prime mover 50 is not concentric with the crank shaft. Concentric location of second prime mover 50 and optional clutches causes limitations in the clearance between components within the clutch and/or second prime mover 50 and/or additional wear to components within clutch and second prime mover 50. Location of second prime mover 50 after the first prime mover 20 mounted concentric with the crank shaft can require additional torque from second prime mover 50 to move components of transmission 30 in order to transmit torque to a transmission mounted PTO and PTO mounted accessory, in comparison to a configuration in which a second prime mover is more directly coupled to an accessory and does not require movement of transmission components to effect motion of the accessory. Additional torque requirements can cause second prime mover 50 to be generally larger, heavier and more expensive than a second prime mover 50 that requires lower torque to move accessory. Rotating transmission 30 to effect motion of the transmission mounted PTO and accessory can also causes losses in efficiency, requiring a larger and more expensive rechargeable energy source.

System 10 may also be configured in as a series hybrid in which two electric motors are used in the propulsion system. The electric motor in a series hybrid system that is directly or indirectly coupled to first prime mover 20 can be used to reduce or eliminate fuel consumption of the first prime mover 20 using the methods described in this patent. Movement of first prime mover 20 in a series system without the use of fuel may be especially advantageous if accessories are coupled directly to the first prime mover 20 and continued operation of those accessories is needed. The accessories may include power steering, HVAC, braking system, pumps or other loads that need to continue to operate when the vehicle is stationary and/or moving. Similarly, system 10 may be configured as a two-mode parallel hybrid that operates automatically as a parallel hybrid or series hybrid.

It is also important to note that the arrangement of the hybrid drive system components, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. For example, although gear types, and optional clutches are discussed, the system can use various components without departing from the scope of the invention unless specifically recited in the claims. In another example, electrical ratings and parameters discussed above can be changed without departing from the scope of the invention unless specifically recited in the claims. Accordingly, all such modifications are intended to be included within the scope of the present disclosure as described herein. The use of the terms shaft or through shaft are used to describe a means to transfer torque and may include couplers, such as but not limited to Lovejoy couplers, flexible couplings, or joints, such as but not limited to U-joints or constant velocity joints, and may be referred to as thru-drive in some applications. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

The invention claimed is:

1. A vehicle drive system for a vehicle, the vehicle drive system comprising:

a first electric energy storage system configured to provide energy at a first voltage;

a second electric energy storage system configured to provide energy at a second voltage, the first voltage and the second voltage being higher than 250 volts;

a direct current voltage to direct current voltage converter disposed between the first electric energy storage system and the second electric energy storage system;

a first electric motor, wherein the first electric energy storage system is configured to provide power to the first electric motor for rotating wheels of the vehicle, and wherein the second electric energy storage system is configured to provide power for power exportation or for an accessory, wherein the first motor is configured to generate energy for storage in the first electric energy storage system via rotation;

a second electric motor configured to drive other loads using energy from the second electric energy storage system, the second electric motor being configured to drive a generator, hydraulic motor, pump, or compressor using energy from the second electric energy storage system; and a control system configured to transfer energy between the first electric energy storage system and the second electric energy storage system to achieve a desired driving range and a desired energy for the accessory or for power exportation and wherein the control system is configured to rotate the second electric motor at a selected speed for driving the generator, hydraulic motor, pump, or compressor using energy from the second electric energy storage system.

2. The vehicle drive system of claim 1, further comprising a high power generator coupled to the second electric motor, wherein the second electric motor is configured to generate energy for storage in the first electric energy storage system via rotation using power from a first prime mover and drives the high power generator using energy from the second electric energy storage system.

3. The vehicle drive system of claim 1, wherein the second electric motor is in direct or indirect mechanical communication with a power take off.

4. The vehicle drive system of claim 1, the first electric energy storage system is configured to be charged from an external source.

5. The vehicle drive system of claim 4, wherein the external source is a grid.

6. The vehicle drive system of claim 1, wherein the first electric energy storage system is configured to be charged from an external source via a single plug, wherein the second electric energy storage system configured to be charged via the direct current voltage to direct current voltage converter and not directly via the single plug.

7. The vehicle drive system of claim 6, wherein the single plug is a level 2 J1772 interface.

8. The vehicle drive system of claim 1, wherein the first voltage is above 350 V or greater and the second voltage is 350 V or less.

9. The vehicle drive system of claim 1, further comprising:

a power take off configured to be in mechanical communication with the second electric motor, and to drive using power from the second electric motor and a first prime mover to provide surge power.

10. The vehicle drive system of claim 1, wherein the direct current voltage to direct current voltage converter comprises a bidirectional direct current voltage to direct current voltage converter and is a 20 kW converter.

11. The vehicle drive system of claim 1, wherein the direct current voltage to direct current voltage converter comprises a bidirectional direct current voltage to direct current voltage converter and comprises a power inverter.

12. The vehicle drive system of claim 1, wherein the energy is shifted from the second electric energy storage system to the first electric energy storage system if the control system determines there may be insufficient energy to achieve the desired driving range.

13. The vehicle drive system of claim 1, wherein the control system includes an inverter and the first voltage is higher than the second voltage.

14. The vehicle drive system of claim 1, wherein the second voltage is 350V.

15. The vehicle drive system of claim 1, wherein the energy is shifted from the first electric energy storage system to the second electric energy storage system if the control system determines there may be insufficient energy to power the accessory at a work site.

16. A vehicle drive system for a vehicle, the vehicle drive system comprising:

a first electric energy storage system configured to provide energy at a first voltage, the first electric energy storage system being a traction battery;

a second electric energy storage system configured to provide energy at a second voltage, the second voltage being above 250 volts;

a bidirectional direct current voltage to direct current voltage converter disposed between the first electric energy storage system and the second electric energy storage system;

a first electric motor, wherein the first electric energy storage system is configured to provide power to the first electric motor for rotating wheels of the vehicle, and wherein the second electric energy storage system is configured to provide power for power exportation or for an accessory, the accessory being a pump or hydraulic motor;

a second motor configured to drive other loads using energy from the second electric energy storage system; and a control system configured to transfer energy between the first electric energy storage system and the second electric energy storage system to achieve a desired driving range and a desired energy for the accessory or for power exportation.

17. The vehicle drive system of claim 16, wherein the first electric motor is driven by regenerative braking.

18. The vehicle drive system of claim 16, wherein the second voltage is 350V.

19. The vehicle drive system of claim 16, wherein the energy is shifted from the first electric energy storage system to the second electric energy storage system if the control system determines there may be insufficient energy to power the accessory at a work site.

20. A vehicle drive system for a vehicle, the vehicle drive system comprising:

a combustion engine;

a first battery electric energy storage system configured to provide energy at a first voltage;

a second battery electric energy storage system configured to provide energy at a second voltage, the first voltage and the second voltage being above 250 volts;

a bidirectional direct current voltage to direct current voltage converter disposed between the first battery electric energy storage system and the second battery electric energy storage system;

a first electric motor configured to rotate wheels of the vehicle using energy from the first battery electric energy storage system, and wherein the second battery electric energy storage system is configured to provide power for power exportation or for an accessory, the accessory being a pump or hydraulic motor;

a second electric motor in direct or indirect mechanical communication with the combustion engine, wherein the second electric motor is configured to generate energy for storage in the second battery electric energy storage system via rotation using power from the combustion engine and configured to drive other loads using energy from the second battery electric energy storage system; and a control system configured to transfer energy between the first battery electric energy storage system and the second battery electric energy storage system to achieve a desired driving range and a desired energy for the accessory or for power exportation.

\* \* \* \* \*